(12) United States Patent
Owen

(10) Patent No.: US 7,990,242 B2
(45) Date of Patent: Aug. 2, 2011

(54) TRANSIENT VOLTAGE AND HARMONIC CURRENTS QUASHING (THQ) TRANSFORMERS, TRANSFORMER WINDING TOPOLOGY, AND METHOD OF MAKING THE SAME

(75) Inventor: Donald W. Owen, Plano, TX (US)

(73) Assignee: Howard Industries, Inc., Laurel, MS (US)

( * ) Notice: Subject to any disclaimer, the term of this patent is extended or adjusted under 35 U.S.C. 154(b) by 0 days.

(21) Appl. No.: 12/510,979

(22) Filed: Jul. 28, 2009

(65) Prior Publication Data

US 2010/0019876 A1    Jan. 28, 2010

Related U.S. Application Data

(60) Provisional application No. 61/084,151, filed on Jul. 28, 2008.

(51) Int. Cl.
*H01F 30/12* (2006.01)

(52) U.S. Cl. ............................................. 336/5; 336/12

(58) Field of Classification Search ........................ None
See application file for complete search history.

(56) References Cited

U.S. PATENT DOCUMENTS

| | | | |
|---|---|---|---|
| 4,092,621 A | 5/1978 | Syswander et al. | |
| 5,216,356 A * | 6/1993 | Owen | 323/361 |
| 7,049,921 B2 | 5/2006 | Owen | |
| 2007/0024264 A1 | 2/2007 | Lestician | |
| 2008/0037192 A1* | 2/2008 | Huang et al. | 361/118 |
| 2009/0273297 A1* | 11/2009 | Kelly | 315/247 |

* cited by examiner

*Primary Examiner* — Anh T Mai

(74) *Attorney, Agent, or Firm* — Yudell Isidore Ng Russell PLLC

(57) ABSTRACT

Different configurations of transient voltage quashing (TQ) transformers, harmonic current quashing (HQ) transformers, and transient voltage and harmonic current quashing (THQ) transformers include one or more of: a tertiary winding radially placed between the primary and secondary windings, with a surge suppressors coupled thereto, which quashes transient voltages in the transformer and any output device attached to output leads of the tertiary or secondary windings; and an arrangement of the secondary windings, separated by at least a second type intra-winding insulation, into one or a plurality of output winding groups, each used to provide power to N serially-connected output devices that exhibit known/expected output voltage characteristics. The second type intra-winding insulation has a dielectric strength to withstand the sum of the voltage output of the device being powered by the output winding and the adjacent serially-connected device, such that the output device experiences minimal harmonic currents.

34 Claims, 15 Drawing Sheets

TRANSIENT VOLTAGE AND HARMONIC CURRENTS QUASHING (THQ) TRANSFORMERS, TRANSFORMER WINDING TOPOLOGY, AND METHOD OF MAKING THE SAME

BACKGROUND OF THE INVENTION

1. Technical Field

The present invention relates generally to electrical circuits and in particular to transformer circuits. Still more particularly, the present invention relates to multiple winding transformer circuits and designs and applications thereof.

2. Description of the Related Art

Variable frequency drives are generally used to control the frequency of the electrical power supplied to an alternating current (AC) motor system. One use of variable frequency drives is to power large pumping systems in the offshore petroleum industry. Different types of variable frequency drives exist, with one type being made up of multiple three-phase to single-phase converters/inverters. Each of the multiple converters/inverters is electrically isolated from the others. The multiple converters/inverters are then connected in three series circuits to compose three output phases of the variable frequency drive. FIG. 1 illustrates an example variable frequency drive 100 with three output legs, output A, output B, and output C, each comprised of four series-connected three-phase to single-phase converter/inverters 110. The legs of the variable frequency drive are connected at a midpoint neutral 107. Powering of these types of variable frequency drives (100) requires the use of one or multiple three phase power supply system(s) or power source(s), and this three phase powering is difficult because of the complexity of the variable frequency drive (e.g., multiple isolated three phase inputs are required for the converters/inverters). Additionally, with these variable frequency drives and the conventional powering systems applied/utilized, the overall configuration/design manifests/exhibits a high incidence of harmonic currents in the power supply. Also, the conventional configuration/design manifests/exhibits the presence of transient voltages, which are induced into the output circuits.

SUMMARY

Disclosed are a plurality of three phase transformer circuits, devices and/or systems and a method of making and using the transformer circuits, devices, and/or systems, where the resulting transformer circuit/device/system provides beneficial operational functionality including transient voltage quashing and/or harmonic current quashing. Also disclosed is a method and/or transformer circuit/device/system for powering a variable frequency drive with the resulting operational functionality of transient voltage quashing and/or harmonic current quashing in the power supply, the overall system as well as in any connected output device.

A first embodiment provides a transient voltage quashing (TQ) three-phase transformer comprising: a magnetic core having three limbs; three levels of windings placed around the three limbs. These winding levels include: a primary winding placed around each limb of the magnetic core and having terminals at which a three phase power supply may be connected; secondary windings placed around the limbs of the magnetic core and radially spaced from said primary winding, and which provide a plurality of output winding groups; and tertiary windings placed radially in between said primary windings and said secondary windings. The TQ transformer further comprises a plurality of surge suppressors coupled to the tertiary windings and which suppress transient voltages in (a) the tertiary windings, (b) external circuits/devices connected to the tertiary windings, (c) the secondary windings and (d) external circuits/devices connected to the output winding groups of the secondary windings.

A second embodiment provides a harmonic current quashing (HQ) three-phase transformer comprising: a magnetic core having three limbs; a primary winding placed around each limb of the magnetic core and having terminals at which a three phase power supply may be connected; secondary windings placed around the limbs of the magnetic core which provide a plurality of output winding groups; and a system of electrical components coupled to the output winding groups, where the system comprises three legs of N serially-connected adjacent electrical devices each having a three phase input and a single phase output, where the N electrical devices exhibit similar output voltage characteristics. The HQ transformer also comprises a plurality of first type intra-winding insulators disposed between each output winding group of the plurality of output winding groups provided by the secondary windings; and a plurality of second type intra-winding insulators disposed between each separate winding of an output winding group. The separate windings of the output winding groups power the N serially-connected adjacent electrical devices in a manner which: (a) subjects the plurality of second type intra-winding insulators disposed between each separate winding of an output winding group to not more than twice the output voltage of each of the electrical devices; and (b) subjects the plurality of first type intra-winding insulators disposed between each output winding group to not more than N+1 times the output voltage of each of the electrical devices. The coupling configuration enables the power supply of the HQ transformer with the electrical system, and output devices connected to the outputs of the electrical system to exhibit minimal harmonic currents.

In one embodiment, the system of electrical components is a variable frequency drive and the N electrical devices are N three phase to single phase converters/inverters, and wherein N is an integer greater than 1. Also, an embodiment of a variable frequency drive system is provided, comprising: a variable frequency drive with three legs of N serially-connected adjacent converters/inverters each having three phase inputs and a single phase output, where the converters/inverters exhibit similar voltage characteristics. One third of the output winding groups of the secondary windings of the HQ transformer are coupled to the inputs of the N serially-connected adjacent converters/inverters on each leg, enabling the power supply and variable frequency drive system and output devices coupled to an output of the variable frequency drive system to exhibit minimal harmonic currents.

In yet another embodiment, the combined features of the first and second embodiment yields a second transient voltage and harmonic current quashing (THQ) three-phase transformer. In this embodiment, the THQ transformer, in addition to the three levels of windings, comprises: a plurality of surge suppressors coupled to the tertiary windings and which suppress transient voltages in (a) the tertiary windings, (b) external circuits/devices connected to the tertiary windings, (c) the secondary windings and (d) external circuits/devices connected to the output winding groups of the secondary windings; and a system of electrical components coupled to the output winding groups, said system comprising three legs of N serially-connected adjacent electrical devices each having a three phase input and a single phase output, where the N electrical devices exhibit similar output voltage characteristics. Additionally, the THQ transformer comprises: a plurality of first type intra-winding insulators disposed between each output winding group of the plurality of output winding groups provided by the secondary windings; and a plurality of second type intra-winding insulators disposed between each separate winding of an output winding group. The separate windings of the output winding groups power the N serially-connected adjacent electrical devices in a manner which: (a) subjects the plurality of second type intra-winding insulators disposed between each separate winding of an output winding group to not more than twice the output voltage of each of the electrical devices; and (b) subjects the plurality of first type intra-winding insulators disposed between each output winding group to not more than N+1 times the output voltage of each of the electrical devices.

In one implementation, the system of electrical components is a variable frequency drive with N serially-connected adjacent converters/inverters on each leg coupled to the THQ transformer output in a configuration that enables the power supply and variable frequency drive system and output devices coupled to an output of the variable frequency drive system to exhibit minimal harmonic currents, as well as low transient voltages.

According to a fourth embodiment, a THQ/TQ/HQ transformer is provided comprising: a magnetic core; a primary winding placed around a limb of the magnetic core and having terminals at which a three phase power supply may be connected; secondary windings placed around the limb of the magnetic core which provide a plurality of output windings; a system of electrical components coupled to the output winding groups, said system comprising N serially-connected adjacent electrical devices each having a three phase input and one of a single phase or direct current (DC) output, where the N electrical devices exhibit similar output voltage characteristics; a plurality of second type intra-winding insulators disposed between each separate winding of an output winding group. The separate windings of the output winding groups power the N serially-connected adjacent electrical devices in a manner which subjects the plurality of second type intra-winding insulators disposed between each separate winding of an output winding group to not more than twice the output voltage of each of the electrical devices.

The above as well as additional features and advantages of the present invention will become apparent in the following detailed written description.

BRIEF DESCRIPTION OF DRAWINGS

The novel features believed characteristic of the illustrative embodiments will be set forth in the claims. The embodiments however, as well as advantages thereof, will best be understood by reference to the following detailed description of illustrative embodiments when read in conjunction with the accompanying drawings, wherein:

DETAILED DESCRIPTION OF ILLUSTRATIVE EMBODIMENT(S)

Embodiments of the present invention provide a plurality of transformer circuits, devices and/or designs for a transient voltage quashing (TQ) three phase transformer, a three phase harmonic current quashing (HQ) transformer, and a three phase transient voltage and harmonic current quashing (THQ) three-phase transformer, which generate one of single phase, direct current (DC), or three phase voltage outputs. The three phase (output) embodiments further provide a method for powering a variable frequency drive using a THQ and/or HQ transformer, wherein the power supply, variable frequency drive and electrical circuit connected thereto experience a very low incident of transient voltage and minimal harmonic currents. Design and manufacture of a THQ transformer and application of that transformer to power an example electrical device having known output voltage characteristics (such as a variable frequency drive (VFD) with three legs of N serially-connected converters/inverters) provides a transformer system or VFD system that exhibits beneficial operational functionality including transient voltage quashing and/or harmonic current quashing within the power supply, the overall system, as well as in any connected output device(s).

In the following detailed description of exemplary embodiments of the invention, specific exemplary embodiments by which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention extends to all devices, which fall within the equivalents of the described embodiments and any appended claims.

Figure 1:
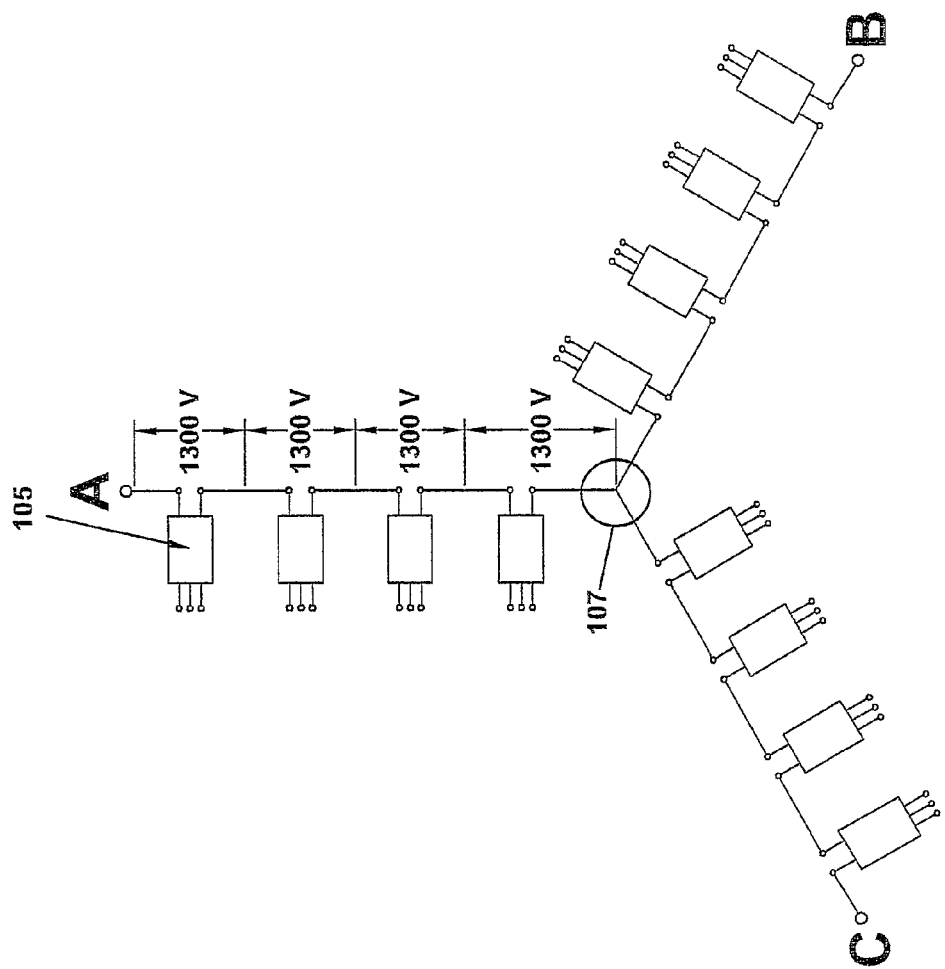
FIG. 1 is a schematic diagram illustrating the topology of a variable frequency drive with multiple three-phase to single-phase converters/inverters, according to the prior art.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention. Moreover, the use of the terms first, second, etc. do not denote any order or importance, but rather the terms first, second, etc. are used to distinguish one element from another.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. As utilized within the described embodiments, the following terms are defined as follows:

(a) THQ/TQ/HQ: acronyms for "transients and harmonic quashing", "transients quashing", and "harmonic quashing", which directly references the quashing of the transients (voltage) and/or harmonics (current) by the particular type of transformer;

(b) quash/quashing: to put down or suppress transient voltages and/or harmonic currents that may otherwise exist in the power supply, the transformer and devices powered by the transformer;

(c) THQ transformer: a transformer designed according to one or more of the embodiments provided herein which exhibits very low transient voltages and minimal harmonic currents when applied to power a device that is connected to the output of the secondary windings. The low transient voltages and minimal harmonic currents are also exhibited in the power supply and connected output devices as well as in devices coupled to the output of the tertiary windings;

(d) TQ transformer: a three phase transformer that is designed with a tertiary winding and surge suppressors coupled to the tertiary winding, which quashes transient voltages in the transformer as well as in any electrical devices coupled to the output windings (tertiary and secondary) of the transformer.

(e) HQ transformer: a transformer that exhibits some similar output characteristics as a THQ transformer except that the HQ transformer is designed without a tertiary winding and surge suppressors to quash transient voltages. The HQ transformer provides minimal harmonic currents in the power supply when utilized to power a specially configured electrical device/system coupled to the outputs of the secondary windings. "HQ transformer" is not synonymous with "THQ transformer" since the HQ transformer is differently configured and does not provide quashing of transient voltages; and (f) variable frequency drive (VFD) system: an electrical system that includes both a variable frequency drive and the THQ and/or HQ transformer windings coupled to the inputs of the converters/inverters of the VFD. The system may also include one or more output circuits coupled to the VFD's output. As illustrated by the figures, a VFD system is depicted with the VFD and the representative transformer windings that are applied to each three phase input of the converters/inverters.

(g) inter-winding insulation: insulation/insulating material placed between the different levels (primary, secondary, and tertiary) of windings and between the magnetic core and the primary winding;

(h) intra-winding insulation: insulation/insulating material that is placed between different windings and separating groups of windings of the output windings groups of the secondary winding;

(i) first type intra-winding insulation: insulation material that is placed between and/or which separates the different output winding groups of the secondary winding. The first type intra-winding insulation has a minimum dielectric strength which is at least equal to a sum of the total voltage outputs provided by the electrical devices being powered by an output winding group plus an output voltage of a first adjacent electrical device on a next leg of the electrical system powered by a next output winding group; and (j) second type intra-winding insulation: insulation material that is placed between and/or which separates the different individual windings in a single output winding group of the secondary winding. The second type intra-winding insulation has a minimum dielectric strength which is at least equal to a sum of voltage outputs provided by two adjacent electrical devices being powered by the separate winding of an output winding group.

Embodiments described herein provide a series of TQ, HQ and/or THQ transformers, transformer designs and systems that provide input voltage power for various types of devices/systems, such as medium voltage variable frequency drives. Several different embodiments are provided of the THQ and/or HQ transformers, with each embodiment having different topology/configurations and/or numbers of secondary windings of the transformer (i.e., a different secondary winding topology), which yield different functional characteristics when applied to the specific type of output device (e.g., variable frequency drive) for which the particular transformer is suited to power. As provided for herein and described below, the representative variable frequency drives each comprise multiple three-phase to one-phase converters/inverters serially-connected on each of three legs of the VFD. The example converters/inverters may include a rectifier and an inverter and receive three phase voltage inputs from the three phase implementation of THQ or HQ transformer and generate single phase output voltages. The designs of the VFDs utilized within the various examples provide that each converter/inverter exhibits similar output voltage characteristics. For example, in the illustrative embodiments of FIGS. 2-6, described below, each converter/inverter yields substantially the same output voltage (1300V) when powered by the THQ or HQ transformer. Because of the specific assignment of adjacent converters/inverters to output winding groups with a system designed with a three phase THQ or HQ transformer powering the VFD, each output winding of the THQ or HQ transformer experiences a voltage of at most twice (2×) the individual output voltage (i.e., 2600V).

A. VFD System with THQ Transformer Windings

Figure 2:
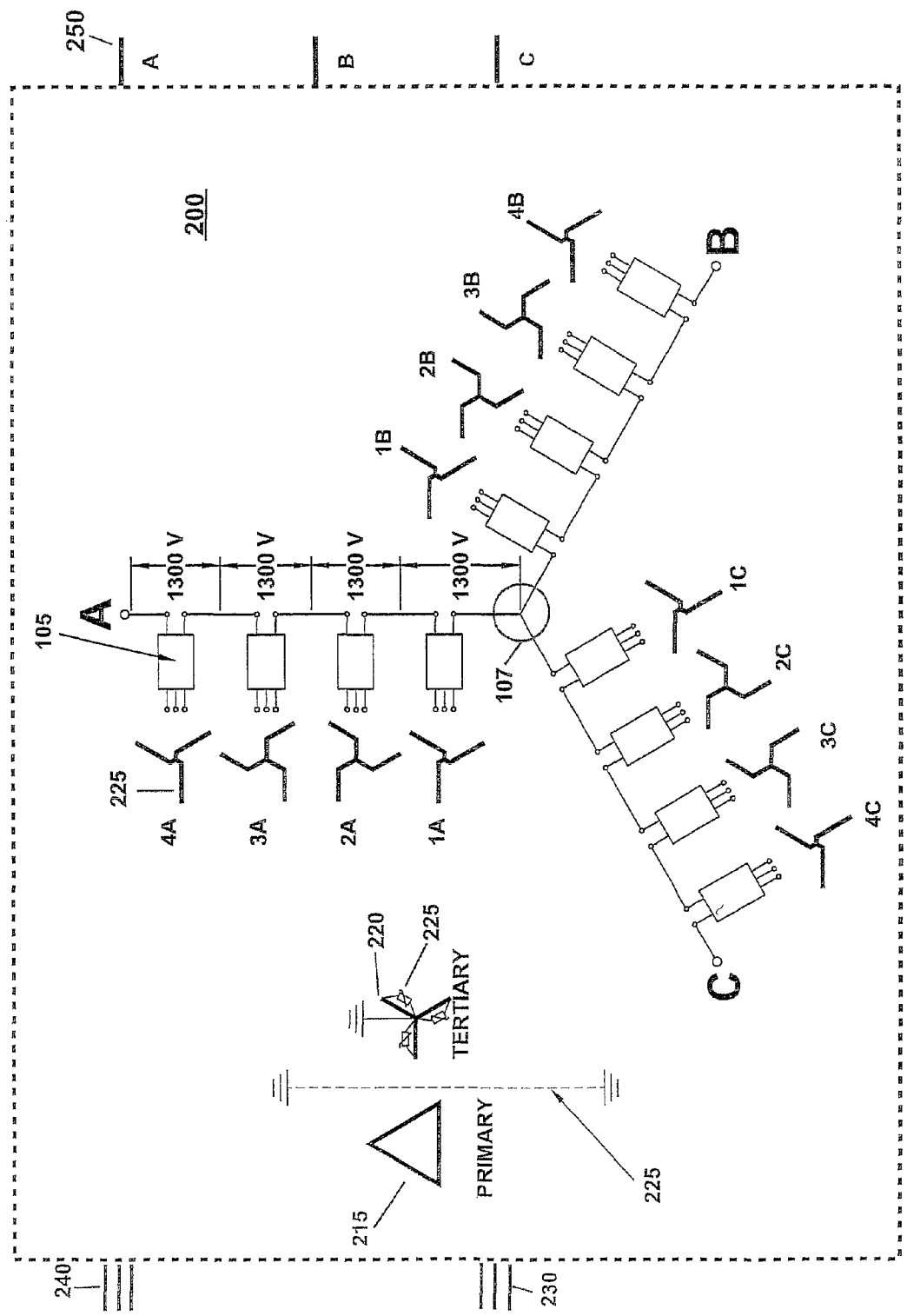
FIG. 2 is a schematic diagram of a variable frequency drive system, illustrating the orientation of the windings of a transient voltage and harmonic current quashing (THQ) transformer and/or a harmonic current quashing (HQ) transformer, designed to power an example variable frequency drive with multiple three-phase to single-phase converters/inverters, according to one embodiment.

Referring now to the figures and in particular to FIG. 2, there is shown an example topology/schematic of a first variable frequency drive (VFD) system 200, according to one embodiment. First VFD system 200 includes a three legged variable frequency drive (100) that is being powered by an example three phase THQ transformer. Because the majority of the embodiments described herein reference a three phase transformer, as opposed to the single phase representation, further references herein to HQ or THQ transformers are assumed to refer to the three phase embodiment. Any reference to a single phase embodiment will be specifically spelled out. The THQ transformer is illustrated/represented by its three levels of transformer windings, namely secondary windings (or output windings) 210, primary windings 215, and tertiary windings 220. The design, structure/configuration/topology and resulting functionality of the THQ transformer and in particular the configuration of the windings relative to each other are described with greater detail with the illustrations and descriptions of FIGS. 7 through 13, below. However, as further illustrated in system 200, an electrostatic shield 225 may be incorporated into THQ transformer, separating the tertiary winding 220 from the primary winding 215. The electrostatic shield 225 is illustrated as a barrier that is connected to a ground terminal. As further shown in system 200, tertiary windings 220 are designed/configured with three line-to-neutral surge suppressors 222, which are coupled line-to-neutral, with the neutral node grounded.

B. TQ Transformer Components

According to the illustrative embodiments, and as illustrated by FIGS. 2-6, surge suppressors 222 are introduced into the tertiary windings 220 of each THQ transformer 1400. This introduction of surge suppressors by coupling to tertiary windings causes the THQ transformer to exhibit a measurable reduction in transient voltages that would normally be induced into the output windings (e.g., secondary windings 210) of a transformer. According to one embodiment, metal oxide varistors (MOV) surge suppressors 225 are connected across the output of the tertiary winding(s) 220 to reduce or limit the transient voltages that would otherwise be induced into the output windings 210. As provided by the various illustrative embodiments, the output windings 210 of the THQ transformer are coupled to (or power) a system of converters/inverters (or rectifiers) of a VFD 100. Because the converters/inverters of the VFD 100 have little or no inductance, the steepness of an induced wave front is not nearly as important as the peak voltage of the transient voltages. Thus, with THQ transformers, the peak voltages of these transient voltages are clamped (i.e., the voltage magnitudes are suppressed) by the use of surge suppressors 222.

Further, by placing the tertiary winding radially in-between the primary and the output windings, the surge suppressors suppress the transient voltages in the tertiary windings and in any external circuitry/device connected to the tertiary windings. Additionally, this arrangement of the tertiary windings with surge suppressors also suppresses transients that would normally be induced into the output windings and any external circuits (e.g., the converters) connected to the output windings 210. The tertiary windings 225 within the various configurations of the THQ transformer may be connected in any three phase connection (i.e., not just a wye connection). However, as provide with FIG. 6, the orientation/placement of the surge suppressors 222 relative to the outputs of the tertiary windings varies based on the configuration of the tertiary windings 220.

With the above considerations, a first embodiment of the invention provides: a TQ/THQ transformer comprising a magnetic core having three limbs; three levels of windings placed around the three limbs. These winding levels include: a primary winding placed around each limb of the magnetic core and having terminals at which a three phase power supply may be connected; secondary windings placed around the limbs of the magnetic core and radially spaced from said primary winding, and which provide a plurality of output winding groups; and tertiary windings placed radially in between said primary windings and said secondary windings. The TQ/THQ transformer further comprises a plurality of surge suppressors coupled to the tertiary windings and which suppress transient voltages in (a) the tertiary windings, (b) external circuits/devices connected to the tertiary windings, (c) the secondary windings and (d) external circuits/devices connected to the output winding groups of the secondary windings.

The tertiary windings are three phase tertiary windings providing three output leads/terminals for connecting to an external circuit/device, and the plurality of surge suppressors comprises three surge suppressors, one coupled to each phase of the tertiary windings. In one embodiment, the surge suppressors are metal oxide varistors (MOV) surge suppressors.

C. Connection Scheme/Topology to Minimize Dielectric Strength of Insulation Required Between Output Windings When Coupled to Serially-connected Output Devices, While Reducing Harmonics Returning now to FIG. 2, variable frequency drive 100 is made up of multiple three-phase to single-phase converters/inverters 105, with four such converters/inverters 105 serially connected to create each leg of the three legs of the VFD (100). Each converter/inverter 105 is electrically isolated from the other converters/inverters (105), and the converters/inverters 105 are connected in three series circuits (each referred to herein as a "leg" because of the illustrated configuration), providing output phases labeled A, B and C. With the example illustration of FIG. 2, there are four serially connected converters/inverters 105 per leg or output phase (A, B, C) of the VFD 100. The VFD system 200 provides three output terminals 250 (corresponding to the output phases A, B, and C) to which an external device (not shown) may be coupled. Each of the three series circuits is coupled to the other series circuits at a neutral 107, with the opposing end for each series circuit providing the single output phases A, B, and C, respectively.

These series circuits of isolated converter/inverters 205 are coupled to three output winding groups (1A-4A, 1B-4B, and 1C-4C) of the secondary windings 210 of a representative THQ transformer or HQ transformer and provide similar output voltage characteristics. As shown by the FIG. 2 example, each converter/inverter receives the three phase input from secondary output winding 210 and generates an output voltage of 1300 volts. This voltage is provided solely for example, and the actual voltage of the output device(s) may be of any value. The boundaries between any two adjacent converters/inventers and the associated transformer winding 105 experiences a maximum voltage swing of two times (2×) the output voltage of the converters/inverters (i.e., 2600 volts). Additionally, the voltage swing experience between the fourth converter/inverter and its associated transformer winding of A (4A) relative to the first converter/inverter and its associated transformer winding of B (1B) is equal to five times (5×) the voltage swing of one converter/inverter (6500 volts), given the topology of four converters/inverters per output phase. This voltage swing is experience between any sequence of converters/inverters that are separated by three intermediate converters/inverters (e.g. 4B to 1C).

It is appreciated that these values are directly dependent on and may changed based on a plurality of factors including, but not limited to: (a) the number of converters/inverter 105 per output phase; (b) the actual output voltages generated by each converter/inverter (i.e., 1300V is only provided as one example yield); (c) the presence of other conditions within the system 200 or connected output devices (not shown) that may directly affect/modify the voltage yields or measured voltages at the outputs of each converter/inverter or the output voltage for each output phase. When the output windings 210 are provided to the VFD 100, the windings (210) within a single output winding group are utilized to power all converters/inverters on a single leg of the VFD. With this requirement and with the 2600V across each adjacent converter/inverter, the intra winding insulation utilized for the second type insulation is an insulation whose dielectric strength is required to support no more than the 2600V.

Returning to FIG. 2 and the illustrative embodiment of the example THQ transformer, the primary windings 215 are arranged in a delta configuration and the tertiary windings 220 are arranged in a Y configuration. The secondary windings are arranged in a zig-zag topology and configured to provide specific phase angle relationships per output winding group to elicit/cause certain positive operational characteristics in the VFD 100.

In order to minimize the harmonic currents associated with the example VFD 100, the four converter/inverters 105 of each output phase must be powered from four three-phase voltages that are phase-shifted relative to one another. Ideally, the four converter/inverters are phase shifted by fifteen (15) electrical degrees relative to one another. The output groups of secondary windings provide four voltage inputs (illustrated by the particular four secondary output windings 205 corresponding to each of the converters/inverters 105 per leg of the VFD 00). The four voltage inputs are phase shifted fifteen degrees apart and power the four converters/inverters 105 of the particular leg of the drive 100. Each voltage input/output winding 210 is provided an alphanumeric label (e.g., 1A, 2A, 3A, 4A), where the letter (A, B or C) represents the leg/output phase of the VFD to which the voltage input is applied, while the number represents the physical count of which one of the sequence of inverters/converters 205 on the leg has its inputs coupled to the particular voltage input/secondary winding. Thus, "3C" references the secondary winding(s) 205 that provide a voltage input to the third converter/inverter 105 on leg C of the VFD 105. The voltage input received from secondary winding 3C would then be phase shifted fifteen degrees from the voltage input of secondary winding 3B and 30 degrees apart from voltage input from secondary winding 3A. The illustrated and above described topology of secondary output windings 205 relative to the converters/inverters 105 in each leg of drive 100 result in a relatively low harmonic content (within the VFD system 200 and any connected output devices), referred to as 24-pulse characteristics.

Figure 3:
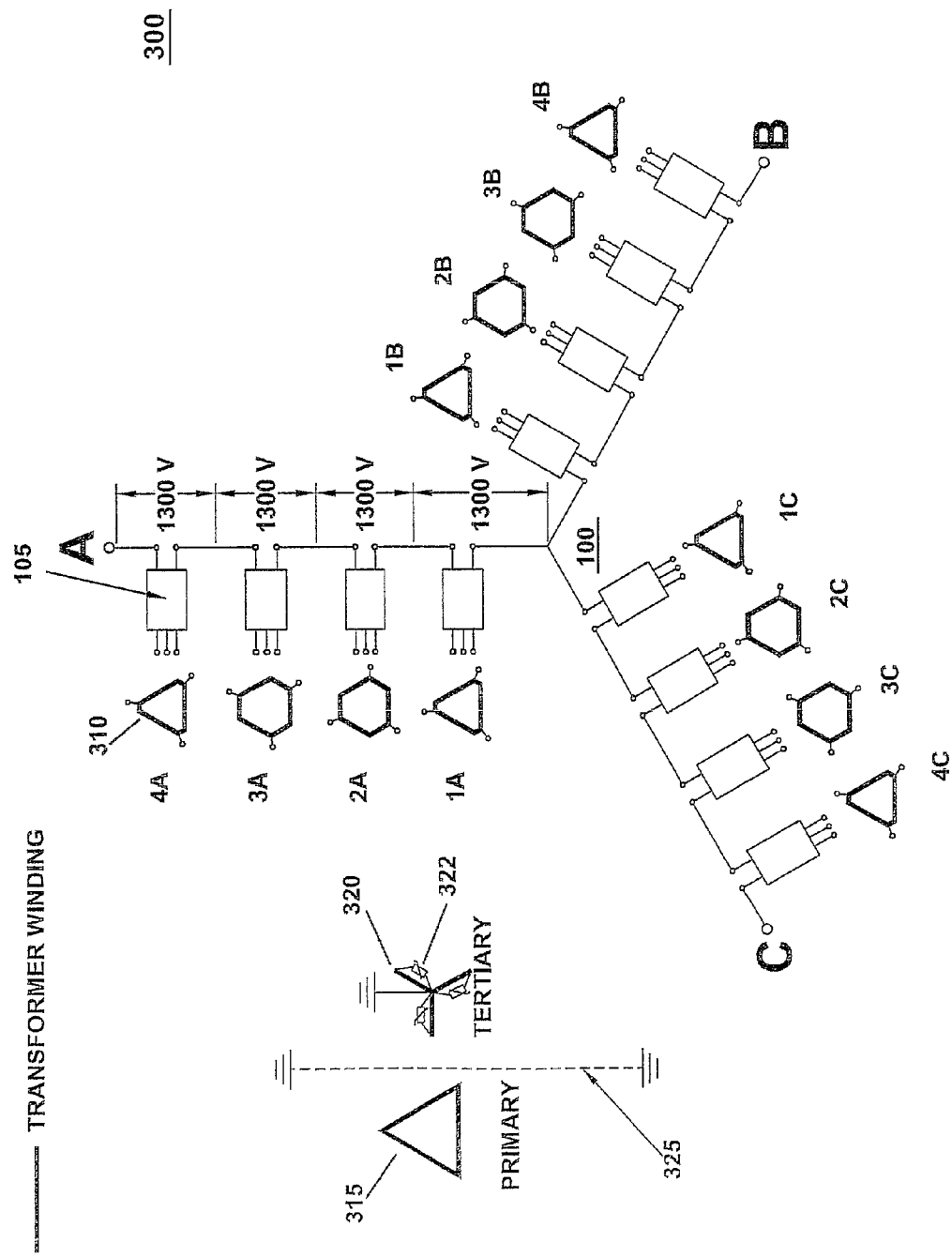
FIG. 3 is a schematic diagram illustrating a different configuration of the windings of a THQ transformer designed to power the example variable frequency drive of FIG. 2, according to one embodiment.

The actual configuration of the secondary windings may vary in alternate embodiments. For example, and as shown by FIG. 3, the VFD system 300 comprises similarly configured drive 100 as provided by FIG. 2, powered by a representative THQ transformer. However, unlike FIG. 2, the THQ transformer of FIG. 3 has a different arrangement/configuration of secondary windings 310, with the secondary windings 310 of FIG. 3 arranged in a polygon configuration. The phase angle relationship between each of the four output voltages (from secondary windings 310) per leg of the drive 100 remains the same however (i.e., 15 degrees apart), to enable the 24-pulse characteristics.

During operation of THQ transformer, the three input terminals/leads 230 of primary winding 215 receives the three phase power supply input from the main voltage source (not shown), while the output terminals/leads 240 of tertiary windings 220 are used to provide power to an external output device (not shown). As provided by FIG. 2 and also illustrated by FIG. 8, described below, the secondary windings 210 provide a large number of output leads/terminals that are grouped into three output winding groups (1A-4A, 1B-4B, and 1C-4C). The output windings of each winding group are then coupled to the three phase inputs of each of the four converters/inverters 105 making up one output phase/leg of the VFD 100. For the given VFS system 200, the secondary windings 210 are arranged/configured in the winding groups according to the topology of the devices to which these output windings are to be coupled. As further described below, the individual windings within a output winding groups and the output winding groups are electrically insulated (isolated) from one another, with insulators selected (having specific dielectric strengths) based on known/expected voltage characteristics of the devices and topology of the electrical system/device being powered by the output windings.

D. TQ, HQ, THQ Transformer Winding Configuration/Topology

In the following descriptions of the various embodiments, reference will be made to the configuration/topology/arrangement of VFD system 200 of FIG. 2 and specifically to the components illustrated therein. Where reference numerals in the 200s are presented, it is appreciated that this is solely for illustration and that the functionality is likely applicable to the other embodiments of VFD systems, as presented in the other figures (i.e., FIGS. 3-6), and occasional reference to functionality related to a particular one of these other embodiments may be provided.

To accomplish the requisite phase-shifting previously described, the three-phase voltage/power source (via the transformer's secondary windings 210) for each converter/inverter 205 may consist of six windings connected in a zig-zag configuration or another type of phase-shifting arrangement that enables the required phase-shifting within the received power inputs of the variable frequency drive 100. As can be deduced from the schematics and in consideration of general knowledge of transformer designs, the construction of a transformer to accomplish the required phase shifting, given the voltage considerations, for powering the variable frequency drive 100 of FIG. 2 is a complex undertaking. A substantial part of the complexity in the design of the resulting THQ transformer involves determining how to arrange the windings so that the required number of coil leads is provided and the voltage stress within and among the windings and leads is/remains manageable. For example, with the variable frequency drive depicted by FIG. 2, the secondary windings 210 depicted in the schematic drawing require thirty-six output leads feeding the twelve converters/inverters 105, thirty-six leads connecting to twelve zig-zag neutral points (not shown) and seventy-two leads connecting thirty-six zig-zag "knee" connections (not shown). This requirement for connecting leads and output leads yields a total of one hundred and forty four leads. In addition to the large number of leads, however, there are also significant voltages involved in the transformer and the variable frequency drive 100, which voltages have to be taken into consideration (and allowances made) when designing the transformer. These voltages exist within each of the twelve zig-zag connected secondary windings 210 and also between those windings and across the leads.

Figure 7:
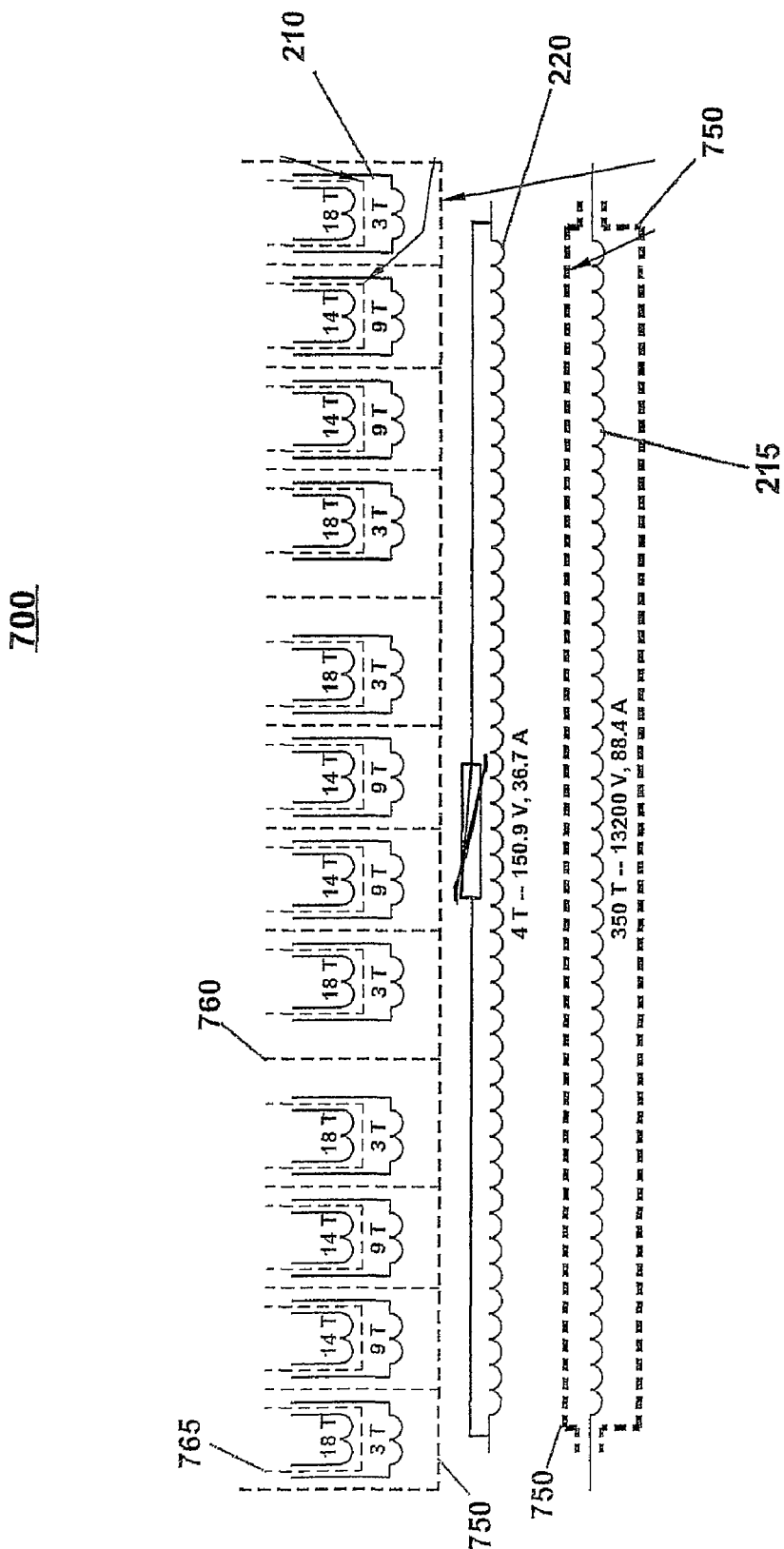
FIGS. 7 and 8 are schematic diagrams illustrating the configuration of the three levels of windings and associated insulation on one of three legs of a THQ transformer, according to one embodiment.
Figure 8:
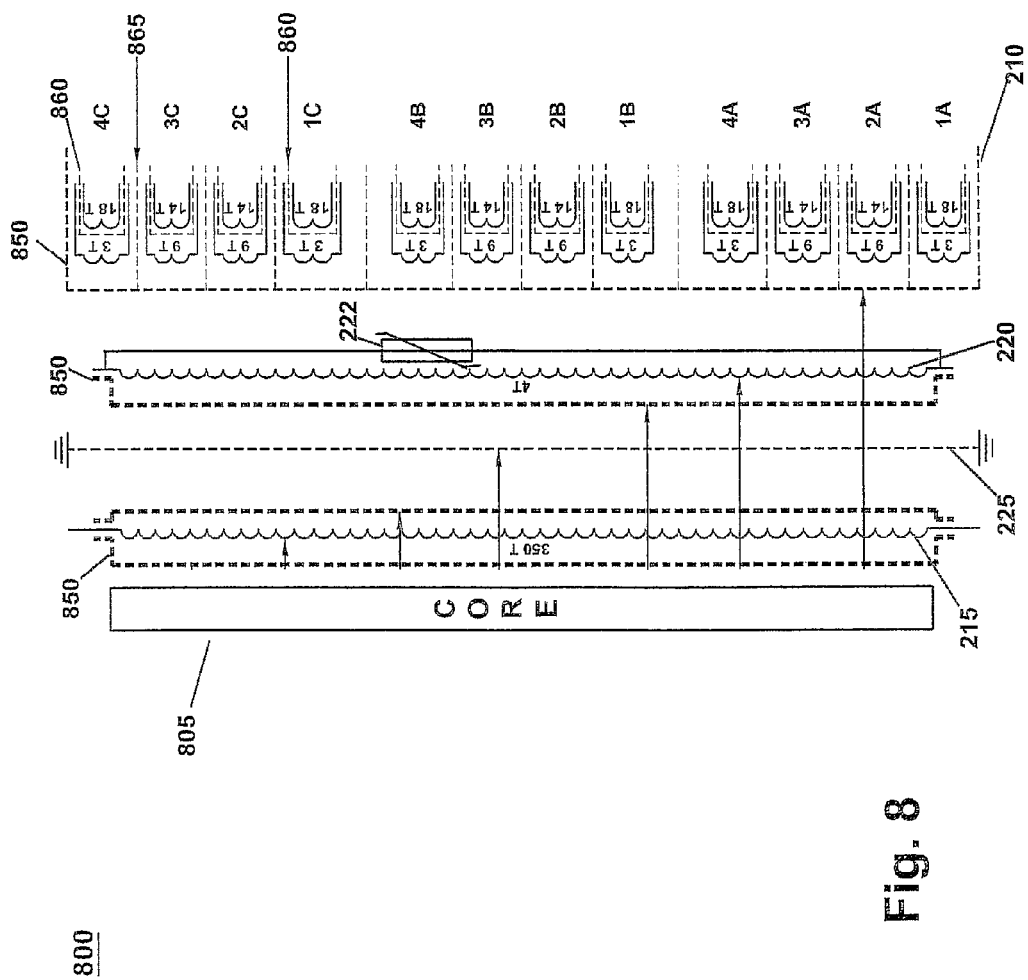

Turning now to FIGS. 7 and 8, there are presented schematic diagrams illustrating one configuration/topology of the three levels of windings for a THQ transformer, according to various embodiments. The illustrated configuration/topology of transformer output windings are designed to power a system/device requiring three sets of 12 phase shifted, input voltages, such as variable frequency drive 100 of FIGS. 2 and 3. A functional/design illustration of the first example THQ transformer 700 is provided by FIG. 7, which may be viewed along with core-winding topology 1000 presented by FIG. 10 (described below) for completeness of the description. FIG. 8 then illustrates the application/coupling, by alphanumeric reference, of the secondary/output windings 210 to respective input leads of converters/inverters 205 of the VFD 100 within VFD system 200 (FIG. 2). Thus, FIG. 8 should be viewed along with FIG. 2 for completeness of understanding of the application of first example THQ transformer 700/800. As provided by FIGS. 7 and 8, THQ transformer 700/800 comprises three isolated windings, primary winding 215, tertiary windings 220, and secondary windings 210, presented in the order in which the windings are wound around a single magnetic core 805 (1005, FIG. 10). For simplicity of the illustration, only one of three coil turns is shown for each level of windings (primary winding 215, tertiary windings 220, and secondary windings 210) representing the winding configuration on a single limb of a three limb magnetic core 805 (1005, FIG. 10).

Also provided between primary winding 215 and secondary windings 220 is an electrostatic shield 225, which is grounded on a ground terminal (not shown). Each winding level is electrically isolated from each other using some form of insulation (barrier) 750/850, and a similar insulation type 750/850 is also provided in the space between the electrostatic shield 225 and the tertiary windings 220, as well as between the electrostatic shield 225 and the primary winding 215. Insulation 750/850 is also provided between the primary winding 215 and the magnetic core 805. As provide herein, the insulation 750/850 is generally referred to as inter-winding insulation because of the insulations placement/location between the levels of windings.

Each winding has a specific number of turns (based on design parameters determined with consideration of the operation/use of the transformer). Primary winding 215 is the input winding of THQ transformer and terminate with three input terminals/leads at which a three phase input power source (the main/primary power source) may be applied. Tertiary winding 220 provide output leads or terminals at which an electrical device/system may be connected. As described above, each tertiary winding 220 has a surge suppressor 222 coupled thereto to provide additional beneficial functionality of a TQ or THQ transformer. Secondary windings 215 are the output windings of THQ transformer at which an external device may be coupled to receive input power (when primary windings are in turn coupled to a main power source). The tertiary winding 220 and electrostatic field 225 are radially located in between the primary winding 215 and secondary windings 210. Specific operational and design characteristics of this particular configuration of THQ transformer 700/800 enable THQ transformer 700/800 to be utilized to power a complex system, such as a variable frequency drive (100), while providing beneficial qualities in the voltage and currents provided.

It is appreciated that a TQ transformer is not necessarily configured with the exact secondary winging topology provided by the illustrative embodiments. Rather, the functionality associated with the substantial reduction in transient voltages within the overall system and within any devices/systems connected to the tertiary and/or secondary output leads apply regardless of the topology of secondary windings utilized within the TQ transformer.

According to the illustrative embodiments, and for the reasons described herein, the output windings of THQ transformer 700/800 comprise seventy-two windings, which are arranged as zig-zag winding groups 1A, 2A, 3A, 4A; 1B, 2B, 3B, 4B; and 1C, 2C, 3C, 4C. These seventy-two windings that compose the output zig-zag winding groups are located radially outside of the primary windings 215 and the tertiary windings 220 (see FIG. 10). With one design/configuration of the example THQ transformer 700/800, the output windings are wound in thirty-six pairs, where twelve pairs are wound on each of the three limbs of the magnetic core 805 (1005, FIG. 10) with the illustrated core-winding configuration. These winding pairs within each output winding group terminate as three phase output leads that are then coupled to three phase inputs of the converters/inverters 105 of one leg of the VFD 100. As shown (FIG. 7/8), each pair of secondary output windings group 205 includes one short winding (e.g., three turns) and one long winding (e.g., 18 turns), and this pair represents two of twelve total windings composing one zig-zag group.

Also, as shown by FIG. 8, each of the pairs of windings represents an input voltage (1A, 2A, etc.) of the multiple input voltages applied to the output devices (e.g., converters/inverted 205 on each leg of a VFD 100). A first type intra-winding electrical insulation 865 (i.e., insulation within the secondary output winding groups) is provided between each output winding group (i.e., an inter-group insulation). This first type intra-winding insulation has a pre-determined dielectric strength based on the expected output voltages of the three phase electrical devices to which the output winding groups are to be connected. Further, each winding and each pair of output windings are electrically isolated from the adjacent winding and pair of windings via a second type intra-winding electrical insulation 860 (i.e., an intra-group insulation). The dielectric strength of this second-type intra-winding insulation must be able to withstand the continuous (summed) output voltages of the two adjacent output devices being powered by the adjacent output winding pairs (e.g., 2600V for the converters/inverters 105 of VFD 100, FIG. 2). It should be noted that absent the specific configuration and wiring topology of the THQ/IHQ transformer to the VFD system or other output devices being powered, a substantially higher rated insulation would be required for both the first type and second type intra-winding insulation, with dielectric strength large enough to withstand continuous voltage of the entire VFD system output voltage.

E. Magnetic Core Winding Placement and Intra-winding Insulation

Figure 10:
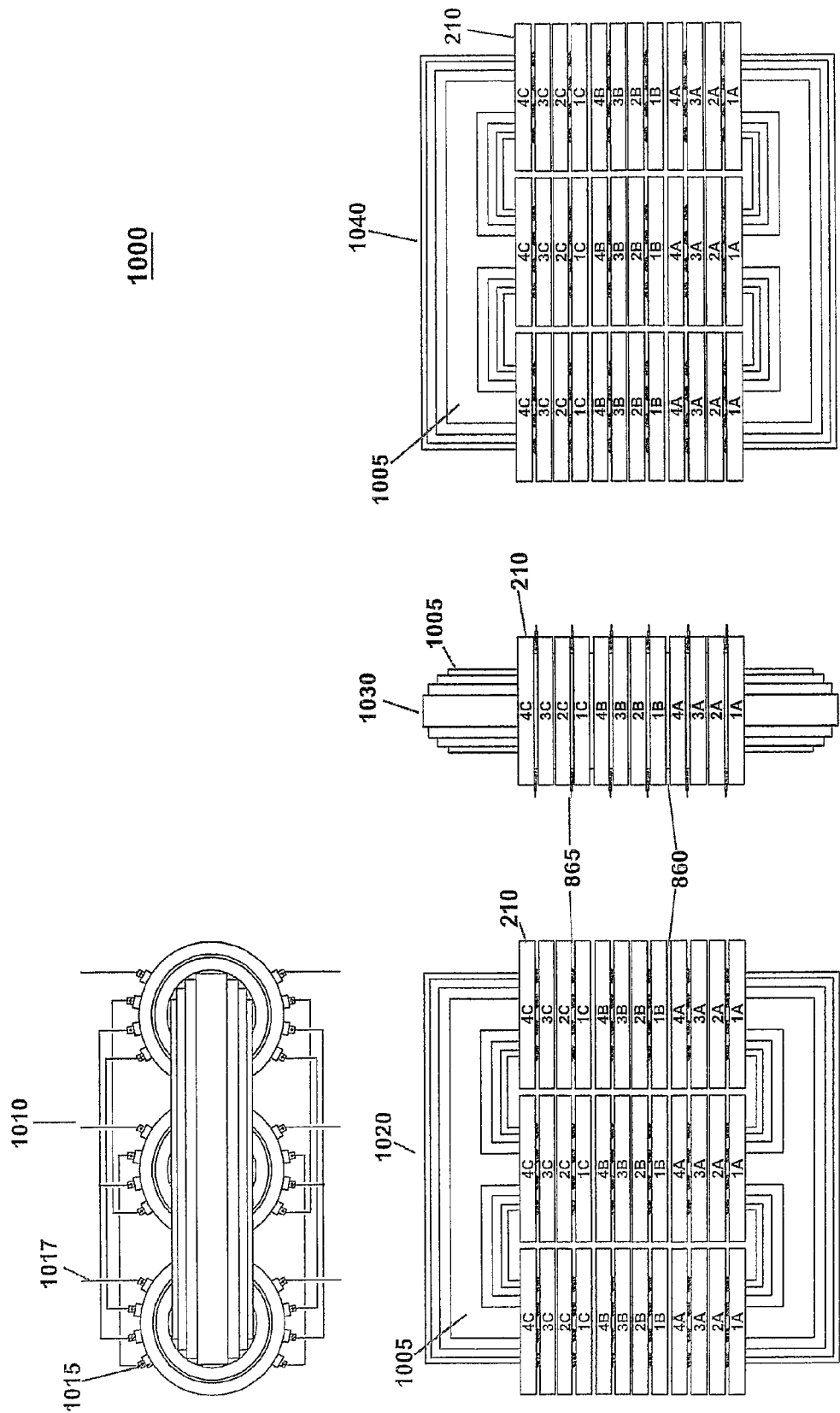
FIGS. 10 and 11 present two illustrations of different views of the secondary windings and associated insulation placed on/around the magnetic core of a THQ (or HQ) transformer, which yield similar power output characteristics when coupled to an electrical device in the configuration provided within the schematics of FIGS. 2 and 3, respectively, in accordance with several alternate embodiments.

FIG. 10 provides multiple different views of secondary/output windings placed around an example three limb magnetic core 1005 of THQ transformer 1000 (700/800) designed according to FIGS. 7 and 8. Four views are illustrated, namely top view 1010, frontal view 1020, lateral/side view 1030, and rear view 1040. Each view clearly illustrates the central core 1005 and the secondary windings 210 placed around the core 1005. Interspersed between the secondary windings are intra-winding insulators, including first type intra-winding insulators 865, placed between each identified output winding groups (A, B and C), and second type intra-winding insulators 860 placed between each winding pair of an output winding group. Of the four views, frontal view 1020 and rear view 1040 clearly illustrate the three limbs of the magnetic core (left, center and right limbs) around which the secondary windings (and primary and tertiary windings) are placed. Also, top view 1010 provides one view of the interconnection of the phases of the windings via leads 1015 exiting from and terminating into the three limbs. Also illustrated are six representative input/output leads 1017 by which THQ transformer 1000 may connect to external devices, such as a main power source (connecting to leads of the primary winding), and one or more electrical devices/loads (connecting to tertiary output leads and/or secondary/output winding leads). The output windings are configured in a radial orientation relative to the other two windings (which are covered over by the secondary windings with the exception of their respective input/output leads).

Figure 6:
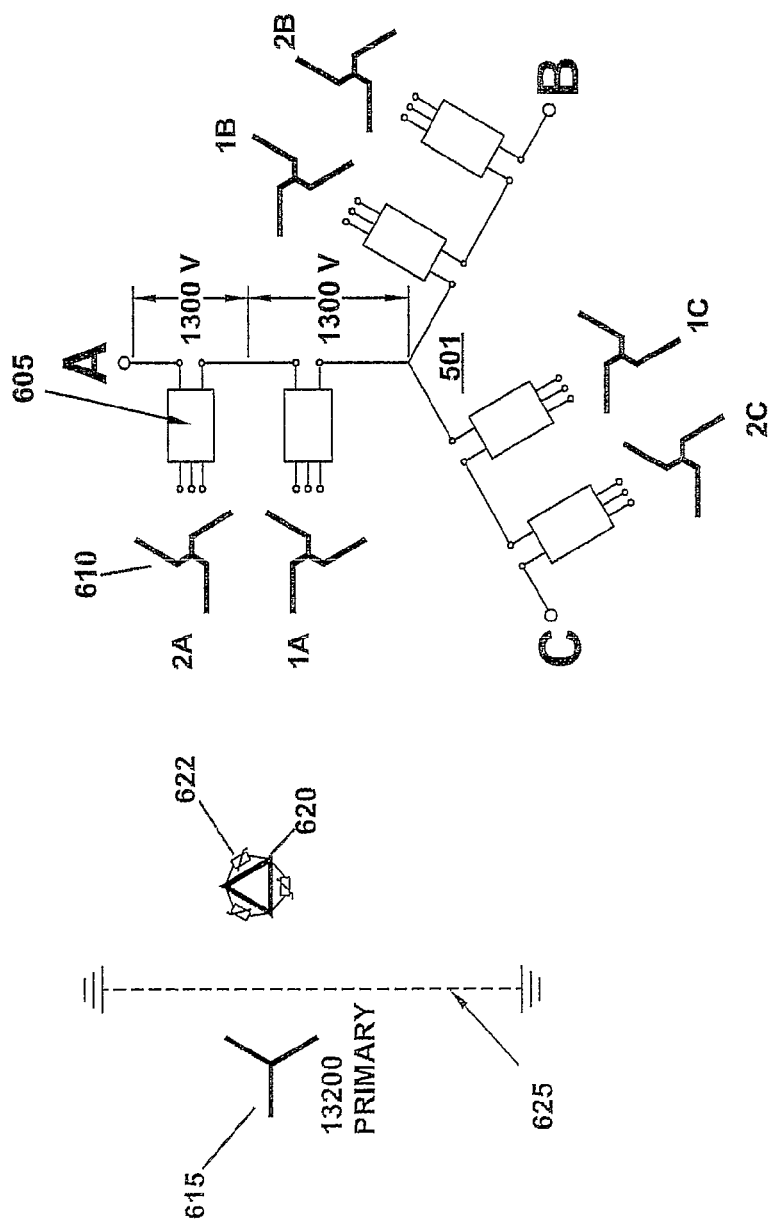
FIG. 6 is a schematic diagram illustrating another configuration of primary and tertiary windings for the THQ transformer within a variable frequency drive system having a similar variable frequency drive as FIG. 5, according to one embodiment.

With each of the configurations of THQ/HQ transformers described herein, the leads (terminals) of the output windings (secondary) of a first output winding group do not extend axially across windings of a different one of the output winding groups. Also, within the various configurations of the THQ/TQ transformers, the tertiary winding may be connected in any three phase connection (i.e., not just wye configuration), as illustrated by FIG. 6.

Notably, the actual configuration of the secondary windings (zig-zag versus polygon) does not substantially change the resulting views of the magnetic core-winding, although the windings themselves are arranged differently relative to each other from one configuration (e.g., zig-zag) to another (e.g., polygon). It will become clear from the descriptions provided herein, how one would actually construct a polygon output winding topology/configuration for the secondary windings of a THQ or HQ transformer.

F. THQ and HO Transformers

With the above considerations of the VFD 100 required to be powered by the THQ or HQ transformer, a second embodiment of the invention provides a harmonic current quashing (HQ) three-phase transformer comprising: a magnetic core having three limbs; a primary winding placed around each limb of the magnetic core and having terminals at which a three phase power supply may be connected; secondary windings placed around the limbs of the magnetic core which provide a plurality of output winding groups; and a system of electrical components coupled to the output winding groups, where the system comprises three legs of N serially-connected adjacent electrical devices each having a three phase input and a single phase output, where the N electrical devices exhibit similar output voltage characteristics. The HQ transformer also comprises a plurality of first type intra-winding insulators disposed between each output winding group of the plurality of output winding groups provided by the secondary windings; and a plurality of second type intra-winding insulators disposed between each separate winding of an output winding group. The separate windings of the output winding groups power the N serially-connected adjacent electrical devices in a manner which: (a) subjects the plurality of second type intra-winding insulators disposed between each separate winding of an output winding group to not more than twice the output voltage of each of the electrical devices; and (b) subjects the plurality of first type intra-winding insulators disposed between each output winding group to not more than N+1 times the output voltage of each of the electrical devices. The coupling configuration enables the power supply of the THQ transformer, with the electrical system and output devices connected to the outputs of the electrical system, to exhibit minimal harmonic currents.

In one embodiment, the system of electrical components is a variable frequency drive and the N electrical devices are N three phase to single phase converters/inverters, and wherein N is an integer greater than 1. Also, an embodiment of a variable frequency drive system is provided, comprising: a variable frequency drive with three legs/output phases of N serially-connected adjacent converters/inverters each having three phase inputs and a single phase output, where the converters/inverters exhibit similar voltage characteristics. One third of the output winding groups of the secondary windings of the HQ transformer are coupled to the inputs of the N serially-connected adjacent converters/inverters on each leg/output phase, enabling the power supply and variable frequency drive system and output devices coupled to an output of the variable frequency drive system to exhibit minimal harmonic currents.

According to the described embodiments, the first type intra-winding insulator has a dielectric strength which is at least equal to a sum of the total voltage outputs provided by the electrical devices being powered by an output winding group plus an output voltage of a first adjacent electrical device on a next leg of the electrical system powered by a next output winding group. Also, the second type intra-winding insulators has a dielectric strength which is at least equal to a sum of voltage outputs provided by two adjacent electrical devices being powered by the separate winding of an output winding group.

In yet another embodiment, the combined features of the first and second embodiment of three phase transformers (i.e., TQ and HQ transformers) yields a transient voltage and harmonic current quashing (THQ) three-phase transformer. In this embodiment, the THQ transformer, in addition to the three levels of windings, comprises: a plurality of surge suppressors coupled to the tertiary windings and which suppress transient voltages in (a) the tertiary windings, (b) external circuits/devices connected to the tertiary windings, (c) the secondary windings and (d) external circuits/devices connected to the output winding groups of the secondary windings; and a system of electrical components coupled to the output winding groups, said system comprising three legs of N serially-connected adjacent electrical devices each having a three phase input and a single phase output, where the N electrical devices exhibit similar output voltage characteristics. Additionally, the THQ transformer comprises: a plurality of first type intra-winding insulators disposed between each output winding group of the plurality of output winding groups provided by the secondary windings; and a plurality of second type intra-winding insulators disposed between each separate winding of an output winding group. The separate windings of the output winding groups power the N serially-connected adjacent electrical devices in a manner which: (a) subjects the plurality of second type intra-winding insulators disposed between each separate winding of an output winding group to not more than twice the output voltage of each of the electrical devices; and (b) subjects the plurality of first type intra-winding insulators disposed between each output winding group to not more than N+1 times the output voltage of each of the electrical devices.

In one implementation of the THQ transformer, the system of electrical components is a variable frequency drive and the N electrical devices are N three phase to single phase converters/inverters, and wherein N is an integer greater than 1. Also, in this embodiment, one third of the output winding groups of the secondary windings are coupled to the inputs of the N serially-connected adjacent converters/inverters on each leg of the variable frequency drive, enabling the power supply and variable frequency drive system and output devices coupled to an output of the variable frequency drive system to exhibit minimal harmonic currents, as well as low transient voltages.

When enhanced to include secondary windings configured into output winding groups as illustrated and described herein, the functionality of a TQ transformer of the first embodiment further comprises: a ground terminal to ground an electrostatic shield positioned between the primary windings and the tertiary windings; a first insulator disposed between the magnetic core and the primary windings such that the primary windings do not directly touch/interface with the magnetic core; and a plurality of inter-winding insulators disposed between each of the primary windings, the tertiary windings and the secondary windings to electrically isolate each level of winding from each other. The tertiary windings and the plurality of surge suppressors coupled thereto are isolated from the primary windings and secondary windings by two inter-winding insulators. Also, according to one embodiment, the leads from the output windings of a first one of the output winding groups do not extend axially across the leads or windings of a different one of said output winding groups.

One embodiment of the application/use of a TQ/THQ transformer then provides a variable frequency drive system comprising: a variable frequency drive with three legs of serially-connected multiple converters/inverters each having three phase inputs, where the multiple converters/inverters exhibit similar output voltage characteristics; and a TQ/THQ transformer, with one third of the output winding groups of the secondary windings coupled to the inputs of each leg of the serially-connected multiple converters/inverters to enable the power supply and variable frequency drive system to exhibit minimal harmonic currents and low transient voltages. In a related embodiment, the THQ transformer comprises an electrical system having multiple electrical devices with three phase inputs coupled to the plurality of output winding groups of the secondary windings in a coupling configuration that enables the power supply of the TQ/THQ transformer, with the electrical system and output devices connected to the output of the electrical system, to exhibit minimal harmonic currents and low transient voltages.

Figure 4:
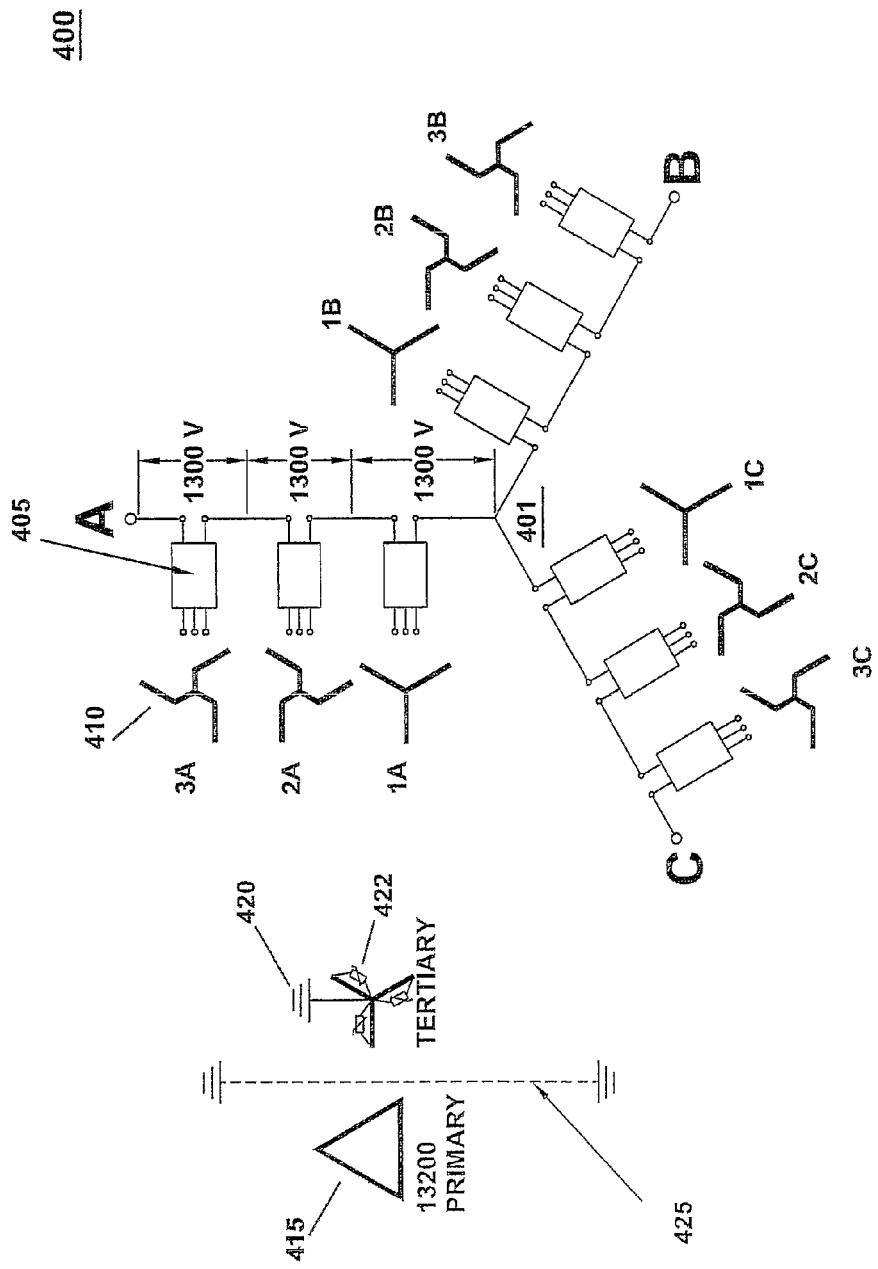
FIGS. 4 and 5 provide schematic diagrams illustrating other configurations of the windings of example THQ transformers which are respectively powering two differently configured variable frequency drives, with smaller numbers of converters/inverters than provided in FIGS. 2 and 3, according to other embodiments.

Various other configurations of THQ transformers and HQ transformers are possible, and the configuration of the different embodiments of transformers directly relate to the topology and output voltage characteristics of the electrical system/device to which the transformer output winding leads may be connected. FIG. 4 presents a schematic diagram of a VFD system 400, with components arranged somewhat similar to that of FIG. 2. However, with VFD system 400, the VFD 401 being powered comprises three converters/inverters 405 per leg (A, B, C). Thus, representative THQ transformer provides only three winding pairs per group of output windings 410 per leg of VFD 401 (rather than the four required to power VFD 100 of FIG. 2). This configuration provides forty-five windings that make up the output zig-zag winding groups 1A, 2A, 3A; 1B, 2B, 3B; and 1C, 2C and 3C, which groups are located radially outside of the primary windings 415 and the tertiary windings 420. With this implementation as well, the phase angle relationship between each voltage source (secondary winding 410) applied to each converter/inverter 405 per leg of drive 401 is again shifted such that each voltage source applied to the converters/inverters 405 on a leg of the drive 401 is fifteen degrees apart. With the VFD system 400 so configured (i.e., the particular configuration of output windings, in conjunction with the nine three-phase to single-phase converter/inverters), the VFD system exhibits a relatively low harmonic content, yielding what is referred to as 18-pulse characteristics.

Figure 5:
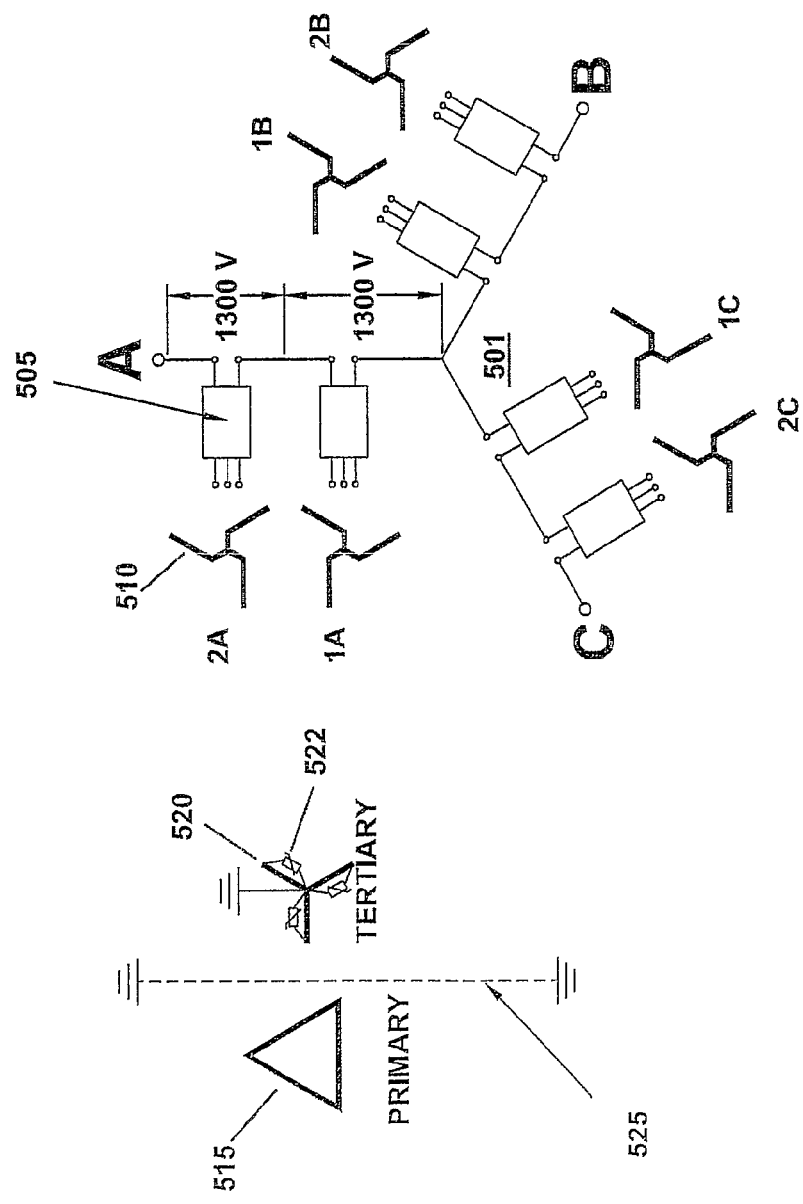

FIG. 5 then illustrates a different configuration of a VFD system 500, in which the VFD 501 comprises only two converters/inverters 505 per leg (A, B, C). With this embodiment, the THQ transformer is configured with thirty-six windings that make up the output zig-zag winding groups 1A, 2A; 1B, 2B; and 1C and 2C. Again this winding group is located radially outside of the primary and the tertiary windings. Thus, representative THQ transformer requires only two sets of secondary windings 510 to power the two converters/inverters 505 per leg of variable drive 501, and this arrangement/configuration of VFD system 500 (the output windings in conjunction with the six three-phase to single-phase converter/inverters) yields operational characteristics referred to as 12-pulse characteristics.

FIG. 6 also shows a VFD system 600, in which the VFD 601 comprises two converters/inverters per leg. However, the configuration of the THQ transformer presented in FIG. 6 differs from that of FIG. 5. Specifically, the arrangement of the primary winding 515/615 and tertiary windings 520/620 are "reversed" relative to each other. That is, in FIG. 5, primary winding 515 is arranged in a delta arrangement, while tertiary winding 520 is arranged in a wye configuration. However, in FIG. 6, primary winding 615 is arranged in a wye configuration, while tertiary winding 620 is arranged in a delta configuration. Notably, when tertiary windings 620 are arranged in a delta configuration, the surge suppressors 622 are coupled line-to-line (rather than line-to-neutral), as illustrated by FIG. 6.

Figure 9:
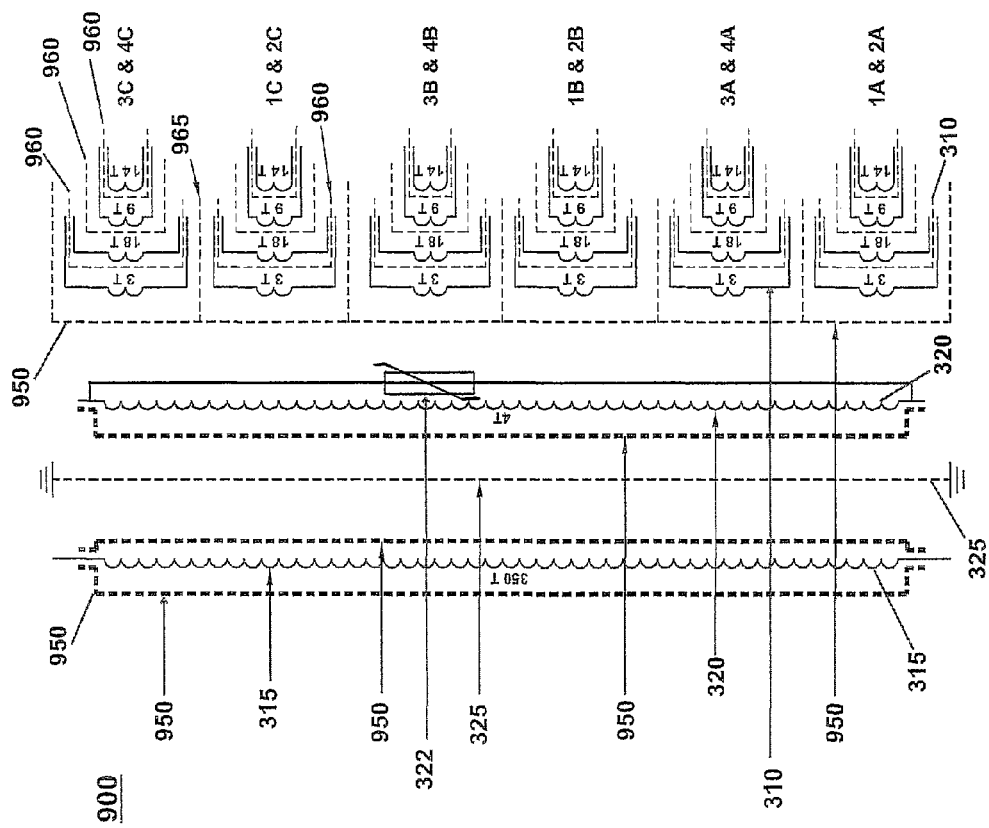
FIG. 9 is a schematic diagram illustrating a different configuration of the three levels of windings and associated insulation on one of three legs of a THQ transformer, in accordance with one embodiment.

Referring now to FIG. 9, there is illustrated a different configuration/design/topology of example THQ transformer 900. THQ transformer 900 also comprises seventy-two windings, which are arranged as zig-zag (output) winding groups 1A, 2A, 3A, 4A; 1B, 2B, 3B, 4B; and 1C, 2C, 3C, 4C. Similarly to FIGS. 7 and 8, the output zig-zag winding groups (1A, 2A . . . 4C) are located radially outside of the primary windings 215 and the tertiary windings 220. Different from the configurations illustrated by FIGS. 7 and 8, however, the output/secondary windings 915 of THQ transformer 900 are wound in eighteen quadruples, (composing one polygon group), where six quadruples are placed on each of three magnetic core limbs of the core-winding orientation (FIG. 10). As illustrated, the quadruples comprise two long and two short windings, which are individually separate from each other by second type intra-winding electrical insulation 960, and the quadruples are further separated from each other by first type intra-winding electrical insulation 965.

Figure 11:
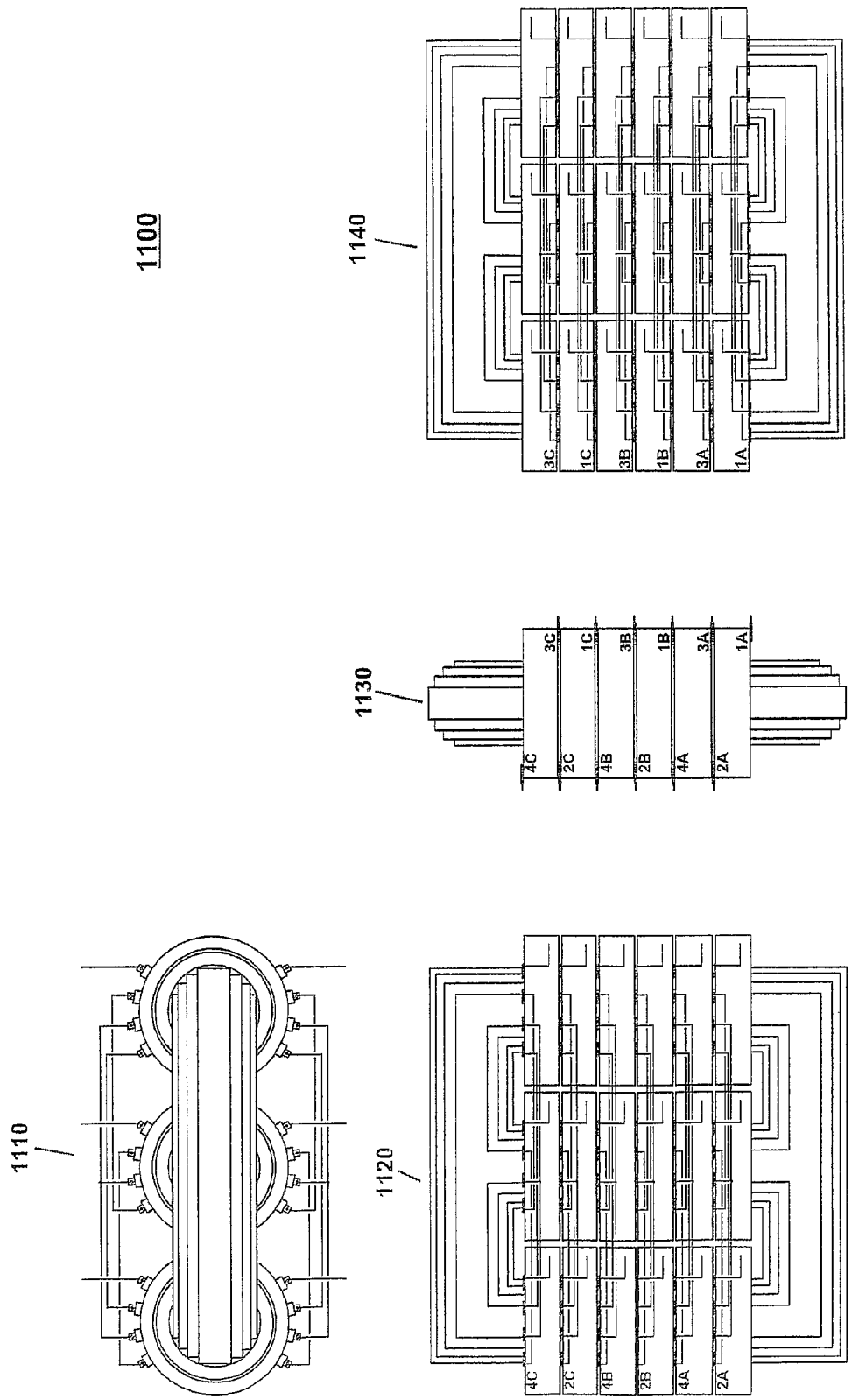

With the different winding topology of THQ/HQ transformer 900 of FIG. 9, the physical/structural representation of the secondary winding on the magnetic core is provided by FIG. 11. With the core winding configuration of FIG. 11, the arrangement of secondary windings and associated insulation barriers in the different views is different from the configuration of FIG. 10. The primary differences can be determined by comparison of the front view 1120, lateral/side view 1130 and read view 1140 of the THQ transformer 900/1100.

Figure 12:
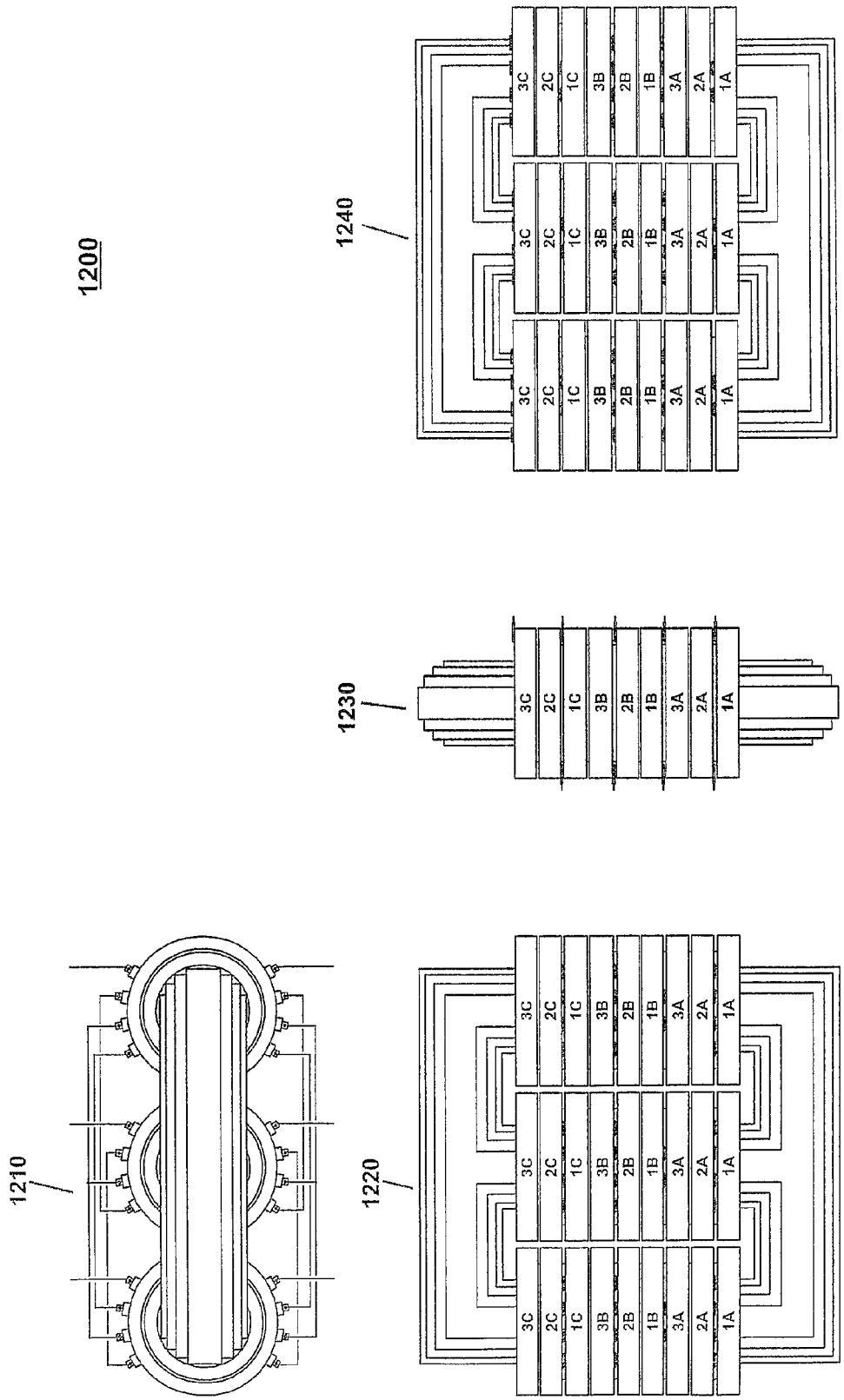
FIGS. 12 and 13 provide two different illustrations of multiple views of the secondary windings and associated insulation placed on/around the magnetic core of the THQ (or HQ) transformer, for a THQ transformer designed for use as provided in FIGS. 4 and 5/6, respectively in accordance with one embodiment.
Figure 13:
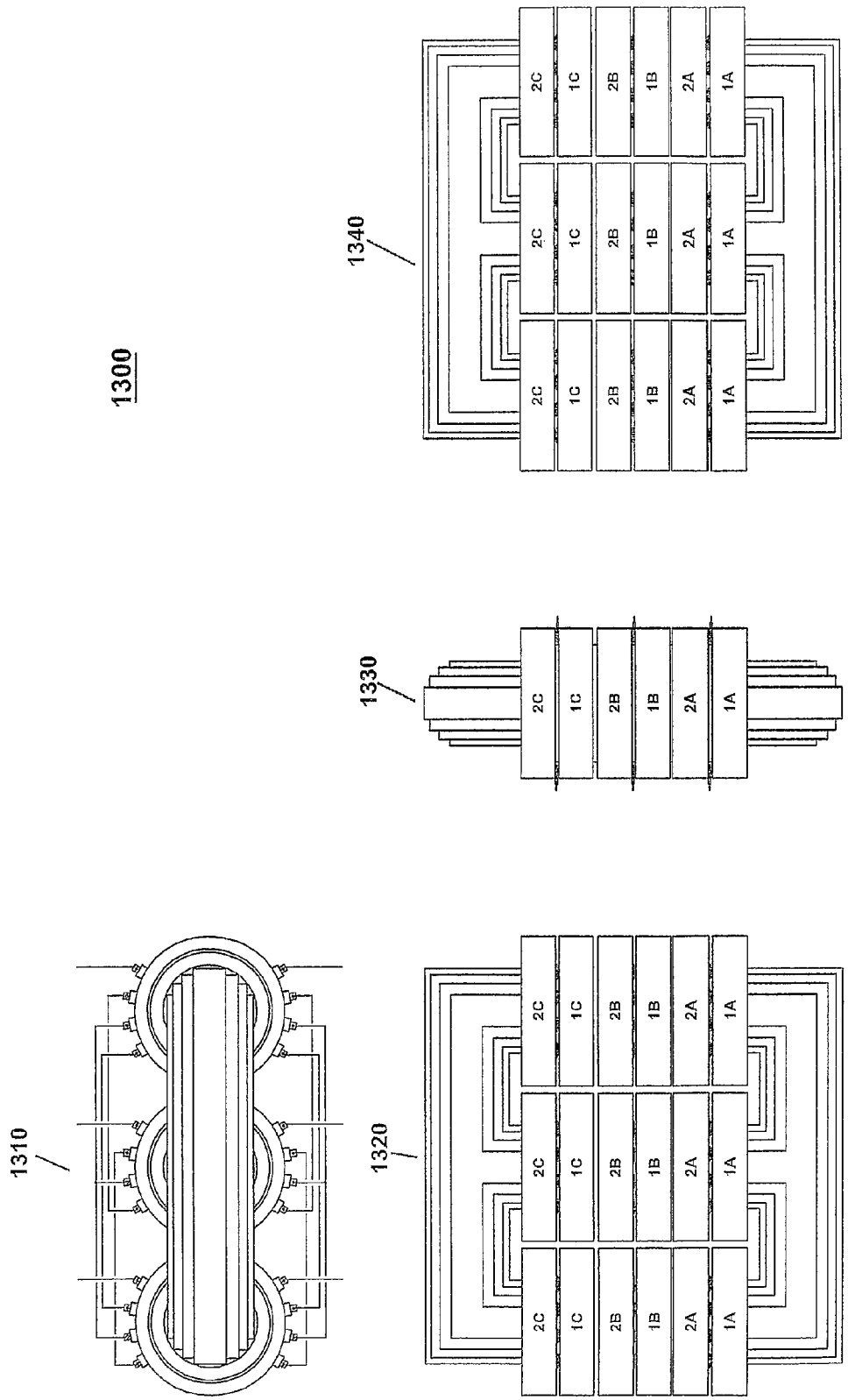

Various alternate embodiments provide different orientations/designs/configurations and/or topologies of THQ transformers based primarily on the expected usage of the THQ/HQ transformer. For example, and as described above with reference to FIGS. 4-6, different THQ transformers are designed to power the different designs/configurations of variable frequency drives, such as the drives illustrated by FIGS. 4-6, as well as other devices for which the functionality provided by the THQ/HQ transformers may be suited. The input configurations of these drives also determine and/or indicate the respective configuration of THQ/HQ transformers utilized to power these drives. The respective core-winding configurations for two of these alternate THQ transformers are illustrated by FIGS. 12 and 13. As can be determined by the alphanumeric labels placed on the secondary output windings, the core winding configuration of FIG. 12 presents a THQ/HQ transformer 1200 that may be utilized to power VFD 401 of VFD system 400 (FIG. 4) and yield 18-pulse characteristics, as described herein. Further, the core winding configuration of FIG. 13 presents a THQ/HQ transformer 1300 that may be utilized to power VFD 501/601 (FIG. 5 or 6), and yield 12-pulse characteristics, as described herein.

G. Single Phase Output and DC Output THQ/TQ/HQ Transformer

For each configuration of THQ/TQ/HQ transformers illustrated and descried above, the three levels of windings (primary, tertiary and secondary) are placed around a common three phase core and generate a three phase output voltage. According to a fourth embodiment, a THQ/TQ/HQ transformer is provided comprising: a magnetic core; a primary winding placed around a limb of the magnetic core and having terminals at which a three phase power supply may be connected; secondary windings placed around the magnetic core which provide one or more (i.e., three) output winding groups; a system of electrical components coupled to the output winding groups, said system comprising N serially-connected adjacent electrical devices each having a three phase input and a single phase or direct current (DC) output, where the N electrical devices exhibit similar output voltage characteristics; a plurality of second type intra-winding insulators disposed between each separate winding of an output winding group. The separate windings of the output winding groups power the N serially-connected adjacent electrical devices in a manner which subjects the plurality of second type intra-winding insulators disposed between each separate winding of an output winding group to not more than twice the output voltage of each of the electrical devices.

In one embodiment, the system coupled to the HQ transformer comprises three legs of the N serially-connected adjacent electrical devices for three phase output. In one implementation, the output is a single phase output, while in an alternate embodiment, the output is a direct current (DC) output.

The embodiment of a single phase output and/or DC output THQ/HQ transformer may be generally represented by the winding topology of FIGS. 2, 7 and 8, with four rectifiers or AC-DC converter circuits per leg of the output device. The three groups of windings represent the secondary/output windings of the transformer. With this embodiment, a similar magnetic core structure may be utilized as provide by FIG. 10. That is, a three leg magnetic core may be utilized with all windings (primary, secondary, and tertiary) placed around the magnetic core. Other features are described below related to the single phase output and/or DC output implementation of a THQ or HQ transformer.

In one implementation of the single phase output or DC output THQ/HQ transformer, the second type intra-winding insulators has a dielectric strength which is at least equal to a sum of voltage outputs provided by two adjacent electrical devices being powered by the separate winding of an output winding group. In one embodiment, the system of electrical components is a rectifier system and the N electrical devices are N three phase to single phase (or DC) rectifiers, and wherein N is an integer greater than 1. Additionally, the single phase THQ/HQ transformer may be utilized within a variable frequency drive system, which comprises: a variable frequency drive with three legs of N serially-connected adjacent converters/inverters each having three phase inputs and a single phase output, where the converters/inverters exhibit similar voltage characteristics. Notably, the single phase output and DC output designs also provide phase shifting with the transformer output and yields a THQ/HQ transformer, which quashes the harmonics in the power supply.

H. General THQ/HQ Transformer and Method for Making/Using

Figure 14:
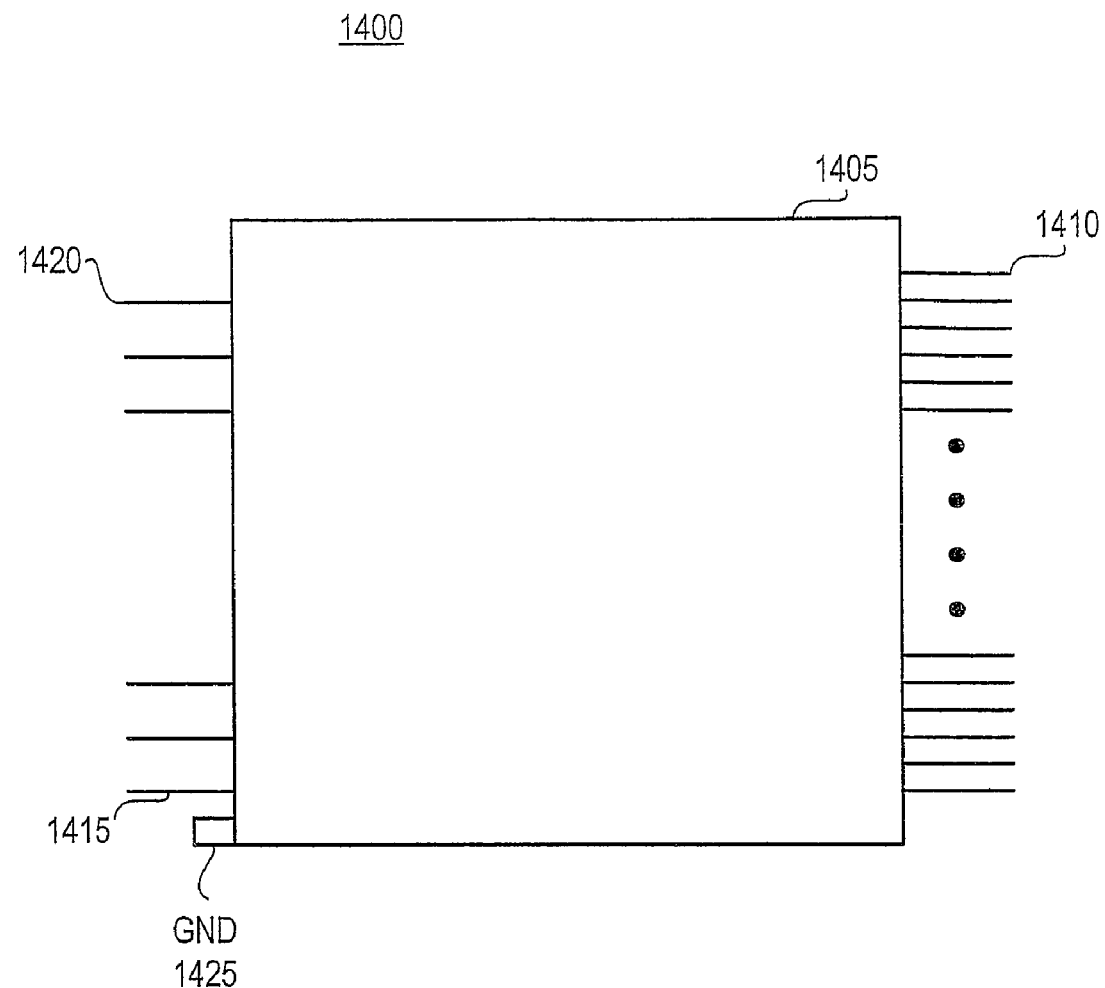
FIG. 14 is a block diagram representation of a THQ or HQ transformer device according to one embodiment.

Turning now to FIG. 14, there is illustrated an external view of an example THQ transformer designed according to one embodiment. THQ transformer 1400 may represent a single phase transformer or a three phase transformer. As shown, THQ transformer 1400 comprises an external casing 1405, within which the magnetic core, three levels of windings, and associated insulation are disposed. THQ transformer 1400 includes a three input terminals/leads 1415 which serve as connection points for coupling an external power supply (such as a main power source) to the primary windings (e.g., primary windings 215) of THQ transformer 1400. THQ transformer 1400 also includes tertiary output terminals/leads 1420, which are the leads extending from tertiary windings (220), and which enables a second output device to be coupled to THQ transformer 1400. THQ transformer 1400 also comprises N output leads/terminals 1410, to which power input leads of an external output device may be coupled. In several of the described embodiments, the external device generates a three phase output, and the N output leads/terminals 1410 of THQ transformer 1400 is separated into three groups of three phase outputs that couple to devices on three output phases/legs of the output device. In the single phase THQ transformer embodiments, however, the N output leads/terminals 1410 is a single group that is coupled to the inputs of a single phase generating output device. As previously described, the topology of the output windings and the required types of intra-winding insulation is different for the single phase implementation versus the three phase implementation of THQ transformer 1400. In one embodiment, an electrical ground 1425 is also provided on the casing 1405 of THQ transformer 1400. The electrical ground 1425 may be internal or external to the casing 1405.

With the above described embodiments, THQ transformer 1400 and the various other possible embodiments thereof, THQ transformers 1400 may be manufactured for utilization within a wide range of secondary devices (e.g., variable frequency drives) and/or the THQ transformer 1400 may be utilized in a variety of applications. One example application of the transformer-drive design/configuration is to power large pumping systems in the offshore petroleum industry.

Figure 15:
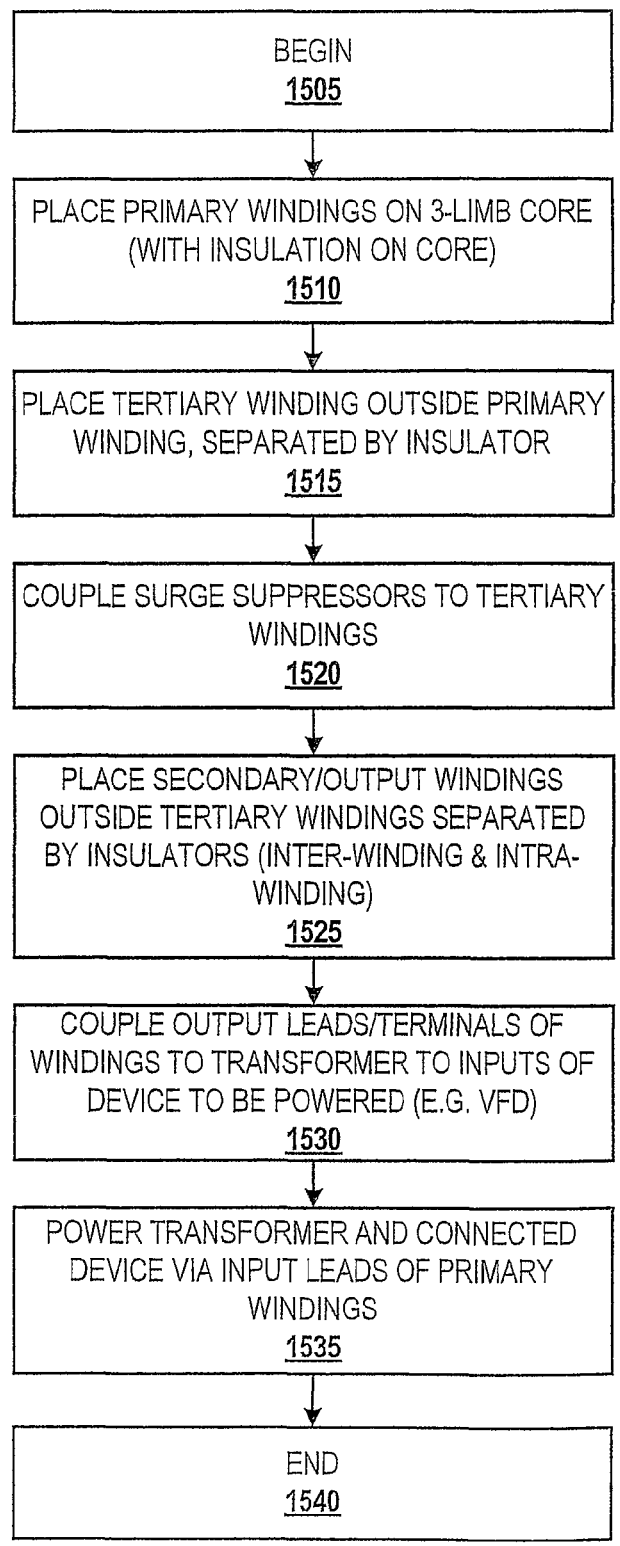
FIG. 15 is a flow chart of the method for manufacturing and using a THQ transformer, according to one embodiment.

Turning now to FIG. 15, there is illustrated a flow chart of a method by which an THQ transformer, such as THQ transformer 1400 may be designed/manufactured and utilized to power one or more electrical devices. The method begins at block 1500 and proceeds to block 1505 at which primary windings are placed on a magnetic core. In the illustrative embodiments, the magnetic core has three limbs. The primary winding has terminals at which a three phase power supply may be connected. The method then proceeds to block 1510 at which tertiary windings are also placed on the magnetic core radially above the primary winding, but separated by an electrical insulator. Surge suppressors are then coupled to the outputs of the tertiary windings in some pre-determined configuration (block 1520). This coupling of surge suppressors is provided to suppress transient voltages in: (a) the tertiary windings; (b) external circuits/devices connected to the tertiary windings; (c) the secondary windings and (d) external circuits/devices connected to the output winding groups of the secondary windings. Notably, the process of attaching the surge suppressors to the tertiary windings may be completed after the transformer windings have all been placed on the magnetic core.

Following, the method proceeds to block 1525 at which secondary output windings arranged in pairs or in some other pre-determined configuration are placed on the magnetic core radially above the tertiary windings. The secondary windings are also separated from the tertiary windings and from each output group and/or section by different electrical insulators, prior to being placed on the magnetic core. The secondary windings provide a plurality of output winding groups. This process further includes providing, based on the known/pre-determined output device voltage characteristics, a plurality of second type intra-winding insulators disposed between each separate winding of an output winding group. Also, where a three phase output device is to be attached to the transformer (i.e., the transformer is a three phase THQ transformer), the method includes providing, based on known/pre-determined output device voltage characteristics, a plurality of first type intra-winding insulators disposed between each output winding group of the plurality of output winding groups provided by the secondary windings. The topology of the three levels of windings placed around the magnetic core with the surge suppressors coupled to the tertiary windings and the configuration of the secondary windings as one or a plurality of output winding groups with different types intra-winding insulators, based on known/pre-determined output device voltage characteristics, yield functional characteristics of minimal transient voltages and low harmonic currents.

As further provided at block 1530, the method comprises coupling input leads/terminals of a system of electrical components to be powered to the leads/terminals of the output winding groups. In one embodiment, the system comprises three legs of N serially-connected adjacent electrical devices each having a three phase input and a single phase output (or a DC output), where the N electrical devices exhibit similar output voltage characteristics. The separate windings of the output winding groups power the N serially-connected adjacent electrical devices in a manner which: (a) subjects the plurality of second type intra-winding insulators disposed between each separate winding of an output winding group to not more than twice the output voltage of each of the electrical devices; and (b) subjects the plurality of first type intra-winding insulators disposed between each output winding group to not more than N+1 times the output voltage of each of the electrical devices.

In one implementation, this process of the method involves coupling the secondary/output windings to inputs of a plurality of variable drives to provide a VFD system. With the output device coupled to the output windings, the method further comprises applying power to the THQ transformer 1400 via input leads of the primary windings to power the VFD system and/or to provide power to some other external output device coupled to the output of the VFD system (block 1535). The process then ends at block 1540.

In one embodiment, the method also comprises: providing a second type intra-winding insulators comprises selecting as the second type intra-winding insulator an insulator having a dielectric strength which is no greater than a sum of voltage outputs provided by two adjacent electrical devices being powered by the separate winding of an output winding group. Then, for a three phase implementation, the method further comprises providing a first type intra-winding insulator comprises selecting as the first type intra-winding insulator a first insulator having a dielectric strength which is no greater than a sum of the total voltage outputs provided by the electrical devices being powered by an output winding group plus an output voltage of a first adjacent electrical device on a next leg of the electrical system powered by a next output winding group.

According to alternate embodiments, the method also comprises: positioning an electrostatic shield between the primary windings and the tertiary windings; and grounding the electrostatic shield via a ground terminal. The method may also comprise: isolating each level of windings and the first winding from the magnetic core via insulators disposed between each level of windings and between the magnetic core and the primary winding; and positioning leads from the output windings relative to each other such that leads of a first one of the output winding groups do not extend axially across the leads or windings of a different one of said output winding groups. Finally, in one embodiment, the method includes attaching an electrical device to the outputs of the tertiary windings.

While the invention has been particularly shown and described with reference to exemplary embodiments, it will be understood by those skilled in the art that various changes in form and detail may be made and equivalents may be substituted for elements thereof without departing from the spirit and scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims, including all equivalents thereof.

What is claimed is:

1. A transient voltage quashing (TQ) three-phase transformer comprising:
   a magnetic core having three limbs;
   three levels of windings placed around the three limbs, and including:
      a primary winding placed around each limb of the magnetic core and having terminals at which a three phase power supply may be connected;
      secondary windings placed around the limbs of the magnetic core and radially spaced from said primary winding, and which provide one or more three-phase output winding groups;
      tertiary windings placed radially in between said primary windings and said secondary windings;
   a plurality of surge suppressors coupled to the tertiary windings and which suppress transient voltages in (a) the tertiary windings, and (b) external circuits/devices connected to the tertiary windings; and
   wherein the surge suppressors further suppress transient voltages in (c) the secondary windings and (d) external circuits/devices connected to the output winding groups of the secondary windings.

2. The TQ transformer of claim 1, wherein:
   the tertiary windings are three phase tertiary windings providing three output leads/terminals for connecting to an external circuit/device; and
   the plurality of surge suppressors comprises three surge suppressors, one coupled to each phase of the tertiary windings.

3. The TQ transformer of claim 1, wherein the plurality of surge suppressors are metal oxide varistors (MOV) surge suppressors.

4. The TQ transformer of claim 2, further comprising a ground terminal to ground an electrostatic shield positioned between the primary windings and the tertiary windings.

5. The TQ transformer of claim 1, further comprising:
   a first insulator disposed between the magnetic core and the primary windings such that the primary windings do not directly touch/interface with the magnetic core; and
   a plurality of inter-winding insulators disposed between each of the primary windings, the tertiary windings and the secondary windings to electrically isolate each level of winding from each other;
   wherein the tertiary windings and the plurality of surge suppressors coupled thereto are isolated from the primary windings and secondary windings by two inter-winding insulators.

6. The TQ transformer of claim 1, wherein the leads from the output windings of a first one of the output winding groups do not extend axially across the leads or windings of a different one of said output winding groups.

7. The TQ transformer of claim 1, arranged as a variable frequency drive system comprising:
a variable frequency drive with three legs of serially-connected multiple converters/inverters each having three phase inputs, where the multiple converters/inverters exhibit similar output voltage characteristics; and
the TQ transformer configured according to claim 1, with one third of the three phase output winding groups of the secondary windings coupled to the inputs of each leg of the serially-connected multiple converters/inverters enable the variable frequency drive system to exhibit minimal harmonic currents and low transient voltages.

8. The TQ transformer of claim 1, further comprising:
a electrical system having multiple electrical devices with three phase inputs coupled to the one or more output winding groups of the secondary windings in a coupling configuration that enables a three phase power supply connected to the primary windings to experience minimal harmonic currents and low transient voltages.

9. A method for manufacturing a TQ transformer configured according to claim 1.

10. A harmonic current quashing (HQ) three-phase transformer comprising:
a magnetic core having three
a primary winding placed around each limb of the magnetic core and having terminals at which a three phase power supply may be connected;
secondary windings placed around the limbs of the magnetic core which provide a plurality of three phase output winding groups;
a system of electrical components coupled to the output winding groups, said system comprising N serially-connected adjacent electrical devices each having a three phase input and an output, where the N electrical devices exhibit similar output voltage characteristics;
a plurality of second type intra-winding insulators disposed between each separate winding of an output winding group; and
wherein the separate windings of the output winding groups power the N serially-connected adjacent electrical devices in a manner which subjects the plurality of second type intra-winding insulators disposed between each separate winding of an output winding group to not more than twice the output voltage of each of the electrical devices.

11. The HQ transformer of claim 10, wherein the system comprises three legs of the N serially-connected adjacent electrical devices for three phase output.

12. The HQ transformer of claim 10, wherein the output of each of the N serially-connected adjacent electrical devices is a single phase output.

13. The HQ transformer of claim 10, wherein the output of each of the N serially-connected adjacent electrical devices is a direct current (DC) output.

14. The HQ transformer of claim 11, further comprising:
a plurality of first type intra-winding insulators disposed between each output winding group of the plurality of output winding groups provided by the secondary windings; and
wherein the separate windings of the output winding groups power the N serially-connected adjacent electrical devices in a manner which subjects the plurality of first type intra-winding insulators disposed between each output winding group to not more than N+1 times the output voltage of each of the electrical devices.

15. The HQ transformer of claim 11, wherein the system of electrical components is a variable frequency drive and the N electrical devices are N three phase to single phase converters/inverters, and wherein N is an integer greater than 1.

16. A variable frequency drive system according to claim 11, comprising:
a variable frequency drive with three legs of N serially-connected adjacent converters/inverters each having three phase inputs and a single phase output, where the converters/inverters exhibit similar voltage characteristics; and
the HQ transformer of claim 10, having one third of the output winding groups of the secondary windings coupled to the inputs of the N serially-connected adjacent converters/inverters on each leg, enabling a three phase power supply connected to the primary windings to experience minimal harmonic currents.

17. The HQ transformer of claim 10, wherein the leads from the N output windings of a first one of the output winding groups do not extend axially across the leads or windings of a different one of said output winding groups.

18. A method for manufacturing a HQ transformer configured according to claim 10.

19. A transient voltage and harmonic current quashing (THQ) three-phase transformer comprising:
a magnetic core having three limbs;
three levels of windings placed around the three limbs, and including:
a primary winding placed around each limb of the magnetic core and having terminals at which a three phase power supply may be connected;
secondary windings placed around the limbs of the magnetic core and radially spaced from said primary winding, and which provide one or more three phase output winding groups;
tertiary windings placed radially in between said primary windings and said secondary windings;
a plurality of surge suppressors coupled to the tertiary windings which suppress transient voltages in (a) the tertiary windings, and (b) external circuits/devices connected to the tertiary windings;
wherein the surge suppressors further suppress transient voltages in (c) the secondary windings and (d) external circuits/devices connected to the one or more three phase output winding groups of the secondary windings;
a system of electrical components coupled to the three phase output winding groups, said system comprising N serially-connected adjacent electrical devices each having a three phase input and an output, where the N electrical devices exhibit similar output voltage characteristics;
a plurality of second type intra-winding insulators disposed between each separate winding of each three phase output winding group; and
wherein the separate windings of the one or more three phase output winding groups power the N serially-connected adjacent electrical devices in a manner which: (a) subjects the plurality of second type intra-winding insulators disposed between each separate winding of an output winding group to not more than twice the output voltage of each of the electrical devices.

20. The HQ transformer of claim 19, further comprising:
said secondary windings provide three output windings groups;
said system comprising three legs of the N serially-connected adjacent electrical devices;
a plurality of first type intra-winding insulators disposed between each output winding group of the plurality of output winding groups provided by the secondary windings; and
wherein the separate windings of the output winding groups power the N serially-connected adjacent electrical devices in a manner which subjects the plurality of first type intra-winding insulators disposed between each output winding group to not more than N+1 times the output voltage of each of the electrical devices.

21. The THQ transformer of claim 19, wherein the output of each of the N serially-connected adjacent electrical devices is a single phase output.

22. The THQ transformer of claim 19, wherein the output of each of the N serially-connected adjacent electrical devices is a direct current (DC) output.

23. The THQ transformer of claim 19, wherein:
the tertiary windings are three phase tertiary windings providing three output leads/terminals for connecting to an external circuit/device;
the plurality of surge suppressors comprises three surge suppressors, one coupled to each phase of the tertiary windings; and
the plurality of surge suppressors are metal oxide varistors (MOV) surge suppressors.

24. The THQ transformer of claim 19, further comprising:
a ground terminal to ground an electrostatic shield positioned between the primary windings and the tertiary windings.
a first insulator disposed between the magnetic core and the primary windings such that the primary windings do not directly touch/interface with the magnetic core; and
a plurality of inter-winding insulators disposed between the primary winding and the secondary windings to electrically isolate each level of winding from each other.

25. The THQ transformer of claim 19, wherein the leads from the output windings of a first one of the output winding groups do not extend axially across the leads or windings of a different one of said output winding groups.

26. The THQ transformer of claim 20, wherein the system of electrical components is a variable frequency drive and the N electrical devices are N three phase to single phase converters/inverters, and wherein N is an integer greater than 1.

27. A variable frequency drive system comprising:
a variable frequency drive with three legs of N serially-connected adjacent converters/inverters each having three phase inputs and a single phase output, where the converters/inverters exhibit similar voltage characteristics; and
a THQ transformer configured according to claim 20, and having one third of the output winding groups of the secondary windings coupled to the inputs of the N serially-connected adjacent converters/inverters on each leg, enabling a three phase power supply connected to the primary windings to experience minimal harmonic currents.

28. A method for manufacturing and using the THQ transformer of claim 19.

29. A method for manufacturing and using a THQ transformer comprising:
placing a primary winding around a magnetic core having three limbs, wherein the primary winding has terminals at which a three phase power supply may be connected;
placing secondary windings around the limbs of the magnetic core, wherein the secondary windings are radially spaced from the primary winding, and the secondary windings provide one or a plurality of three phase output winding groups;
placing tertiary windings radially in between said primary windings and said secondary windings;
coupling a plurality of surge, suppressors to the tertiary windings to suppress transient voltages in (a) the tertiary windings; (b) external circuits/devices connected to the tertiary windings; (c) the secondary windings and (d) external circuits/devices connected to the three phase output winding groups of the secondary windings;
providing, based on the known/pre-determined output device voltage characteristics, a plurality of second type intra-winding insulators disposed between each separate winding of each three phase output winding group; and
wherein a topology of the three levels of windings placed around the three limbs with the surge suppressors coupled to the tertiary windings and the configuration of the secondary windings as the plurality of output winding groups with different types intra-winding insulators, based on known/pre-determined output device voltage characteristics, yield functional characteristics of minimal transient voltages and low harmonic currents.

30. The method of claim 29, further comprising:
providing, based on known/pre-determined output device voltage characteristics, a plurality of first type intra-winding insulators disposed between each output winding group of the plurality of three phase output winding groups provided by the secondary windings.

31. The method of claim 29, further comprising:
coupling a system of electrical components to the output winding groups, said system comprising three legs of N serially-connected adjacent electrical devices each having a three phase input and a single phase output, where the N electrical devices exhibit similar output voltage characteristics; and
wherein the separate windings of the output winding groups power the N serially-connected adjacent electrical devices in a manner which: (a) subjects the plurality of second type intra-winding insulators disposed between each separate winding of an output winding group to not more than twice the output voltage of each of the electrical devices; and (b) subjects the plurality of first type intra-winding insulators disposed between each output winding group to not more than N+1 times the output voltage of each of the electrical devices.

32. The method of claim 29, wherein:
the tertiary windings are three phase tertiary windings providing three output leads/terminals for connecting to an external circuit/device;
the plurality of surge suppressors comprises three surge suppressors, one coupled to each phase of the tertiary windings; and
the plurality of surge suppressors are metal oxide varistors (MOV) surge suppressors.

33. The method of claim 29, further comprising:
positioning an electrostatic shield between the primary windings and the tertiary windings; and
grounding the electrostatic shield via a ground terminal.

34. The method of claim 29, further comprising:

isolating each level of windings and the first winding from the magnetic core via insulators disposed between each level of windings and between the magnetic core and the primary winding; and positioning leads from the output windings relative to each other such that leads of a first one of the output winding groups do not extend axially across the leads or windings of a different one of said output winding groups.

* * * * *